US012789092B2

(12) United States Patent
Qu et al.

(10) Patent No.: US 12,789,092 B2
(45) Date of Patent: Nov. 10, 2026

(54) VIRTUAL OBJECT CONTROL METHOD AND APPARATUS, ELECTRONIC DEVICE, STORAGE MEDIUM, AND COMPUTER PROGRAM PRODUCT

(71) Applicant: Tencent Technology (Shenzhen) Company Limited, Shenzhen (CN)

(72) Inventors: Song Qu, Shenzhen (CN); Hui Zhang, Shenzhen (CN); Qing Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 538 days.

(21) Appl. No.: 17/991,698

(22) Filed: Nov. 21, 2022

(65) Prior Publication Data

US 2023/0078340 A1 Mar. 16, 2023

Related U.S. Application Data

(63) Continuation of application No. PCT/CN2022/072332, filed on Jan. 17, 2022.

(30) Foreign Application Priority Data

Jan. 22, 2021 (CN) ........................ 202110090490.9

(51) Int. Cl.
*A63F 13/55* (2014.01)
*A63F 13/42* (2014.01)
(Continued)

(52) U.S. Cl.
CPC .............. *A63F 13/55* (2014.09); *A63F 13/42* (2014.09); *A63F 13/422* (2014.09);
(Continued)

(58) Field of Classification Search
CPC ........ A63F 13/55; A63F 13/42; A63F 13/422; A63F 13/537; A63F 13/5372; A63F 13/822
See application file for complete search history.

(56) References Cited

U.S. PATENT DOCUMENTS 7,470,195 B1 * 12/2008 Baldwin, III .......... A63F 13/45 463/33
2007/0032282 A1 * 2/2007 Hamamoto ............ A63F 13/58 463/9

(Continued)

FOREIGN PATENT DOCUMENTS

CN 110420462 A 11/2019
CN 111672115 A 9/2020

(Continued)

OTHER PUBLICATIONS

Machine Translation of JP 2019-136358. Published Aug. 22, 2019. Obtained from https://www.j-platpat.inpit.go.jp/ Accessed Feb. 15, 2025. (Year: 2019).*

(Continued)

*Primary Examiner* — Carl V Larsen
(74) *Attorney, Agent, or Firm* — ARENTFOX SCHIFF LLP

(57) ABSTRACT

A virtual object control method is provided. In the method, a user selection of a function of a first virtual object is received. A second virtual object is determined as a target virtual object of the function based on a type of the selected function. A determination is made as to whether the target virtual object of the function is to be changed to a third virtual object based on a direction setting operation. The third virtual object is determined as the target virtual object based on the target virtual object of the function being determined to be changed to the third virtual object.

20 Claims, 14 Drawing Sheets

(51) Int. Cl.

*A63F 13/422* (2014.01)
*A63F 13/537* (2014.01)
*A63F 13/5372* (2014.01)
*A63F 13/822* (2014.01)

(52) U.S. Cl.

CPC ........ *A63F 13/537* (2014.09); *A63F 13/5372* (2014.09); *A63F 13/822* (2014.09)

(56) References Cited

U.S. PATENT DOCUMENTS

| | | | | |
|---|---|---|---|---|
| 2009/0325660 | A1* | 12/2009 | Langridge | A63F 13/45 463/2 |
| 2010/0267435 | A1* | 10/2010 | Taya | A63F 13/45 463/2 |
| 2010/0302238 | A1* | 12/2010 | Yonemori | A63F 13/45 345/419 |
| 2011/0319159 | A1* | 12/2011 | Kondo | A63F 13/537 463/29 |
| 2013/0090168 | A1* | 4/2013 | Shikata | A63F 13/428 463/37 |
| 2015/0157940 | A1* | 6/2015 | Hall | A63F 13/5372 463/31 |
| 2018/0024660 | A1* | 1/2018 | Wang | G06F 3/04817 273/110 |
| 2018/0043260 | A1* | 2/2018 | Tang | A63F 13/822 |
| 2018/0339229 | A1* | 11/2018 | He | G06F 3/04847 |
| 2019/0265882 | A1 | 8/2019 | Nakahara | |
| 2019/0299099 | A1* | 10/2019 | Oshino | A63F 13/55 |
| 2020/0282312 | A1* | 9/2020 | Hu | A63F 13/58 |
| 2021/0268383 | A1* | 9/2021 | Uehara | A63F 13/5372 |
| 2023/0182018 | A1* | 6/2023 | Kano | A63F 13/5375 463/31 |
| 2024/0173621 | A1* | 5/2024 | Zhang | A63F 13/2145 |

FOREIGN PATENT DOCUMENTS

| | | | |
|---|---|---|---|
| CN | 112717403 | A | 4/2021 |
| JP | 2019-136358 | A | 8/2019 |

OTHER PUBLICATIONS

Erbsenbrei. Targeting struggles (Healing/DPS target alteration). Online. 2018. Accessed via the Internet. Accessed Feb. 21, 2025. <URL: https://www.reddit.com/r/ffxiv/comments/7qqunq/targeting_struggles_healingdps_target_alteration/> (Year: 2018).*

International Search Report and Written Opinion in PCT/CN2022/072332, mailed on Apr. 13, 2022, 9 pages.

Office Action received for Japanese Patent Application No. 2023-528177, mailed on Jun. 24, 2024, 11 pages (5 pages of English Translation and 6 pages of Original Document).

* cited by examiner

VIRTUAL OBJECT CONTROL METHOD AND APPARATUS, ELECTRONIC DEVICE, STORAGE MEDIUM, AND COMPUTER PROGRAM PRODUCT

RELATED APPLICATIONS

The present application is a continuation of PCT/CN2022/072332 filed on Jan. 17, 2022, which claims priority to Chinese Patent Application No. 202110090490.9 filed on Jan. 22, 2021. The entire disclosures of the prior applications are hereby incorporated by reference in their entirety.

FIELD OF THE TECHNOLOGY

This application relates to the human-computer interaction techniques, including to a virtual object control method and apparatus, an electronic device, a computer-readable storage medium, and a computer program product.

BACKGROUND OF THE DISCLOSURE

The human-computer interaction technique of the virtual scene based on graphics processing hardware can achieve diversified interaction between virtual objects controlled by the user or artificial intelligence according to actual application requirements, which have wide practical value. For example, in a virtual scene such as a game, a real battle process between virtual objects can be simulated.

The skill of the virtual object is of various types, and different types of skills can achieve different battle effects. In the related art, when the controlled virtual object casts the skill, only a target closest to the virtual object or a target selected by tapping/clicking the screen can be used as an action target on which the skill is cast. As a result, the efficiency of selecting a skill action target may be reduced, affecting simulation performance of immersive perception in a virtual scene, and wasting resources of graphics processing hardware.

SUMMARY

Embodiments of this disclosure provide a virtual object control method and apparatus, an electronic device, a non-transitory computer-readable storage medium, and a computer program product, which can improve efficiency of selecting a skill action target, thereby improving simulation performance of immersive perception of a virtual scene and resource utilization of graphics processing hardware.

Technical solutions in the embodiments of this disclosure may be implemented as follows.

An embodiment of this disclosure provides a virtual object control method. In the method, a user selection of a function of a first virtual object is received. A second virtual object is determined as a target virtual object of the function based on a type of the selected function. A determination is made as to whether the target virtual object of the function is to be changed to a third virtual object based on a direction setting operation. The third virtual object is determined as the target virtual object based on the target virtual object of the function being determined to be changed to the third virtual object.

An embodiment of this disclosure provides a virtual object control apparatus, including processing circuitry. The processing circuitry is configured to receive a user selection of a function of a first virtual object. The processing circuitry is configured to determine a second virtual object as a target virtual object of the function based on a type of the selected function. The processing circuitry is configured to determine whether the target virtual object of the function is to be changed to a third virtual object based on a direction setting operation. The processing circuitry is further configured to determine the third virtual object as the target virtual object based on the target virtual object of the function being determined to be changed to the third virtual object.

An embodiment of this disclosure provides an electronic device for controlling a virtual object, the electronic device including a memory and a processor. The memory is configured to store executable instructions. The processor is configured to implement, when executing the executable instructions stored in the memory, the virtual object control method provided in embodiments of this disclosure.

An embodiment of this disclosure provides a non-transitory computer-readable storage medium, storing instructions which when executed by a processor cause the processor to perform the virtual object control method provided in embodiments of this disclosure.

An embodiment of this disclosure provides a computer program product, including a computer program or instructions, the computer program or instructions causing a computer to perform embodiments of the virtual object control method.

The embodiments of this disclosure may include the following beneficial effects:

A virtual object matching a type of a skill is automatically determined as a virtual object on which the skill is to act, so that user operations can be reduced, thereby improving the efficiency of selecting the virtual object. In addition, a user is enabled to manually adjust a cast direction to switch the virtual object on which the skill is to act, so that a hit rate of the skill can be improved, thereby improving the simulation performance of immersive perception of the virtual scene and the resource utilization of the graphics processing hardware.

DESCRIPTION OF EMBODIMENTS

Figure 1A:
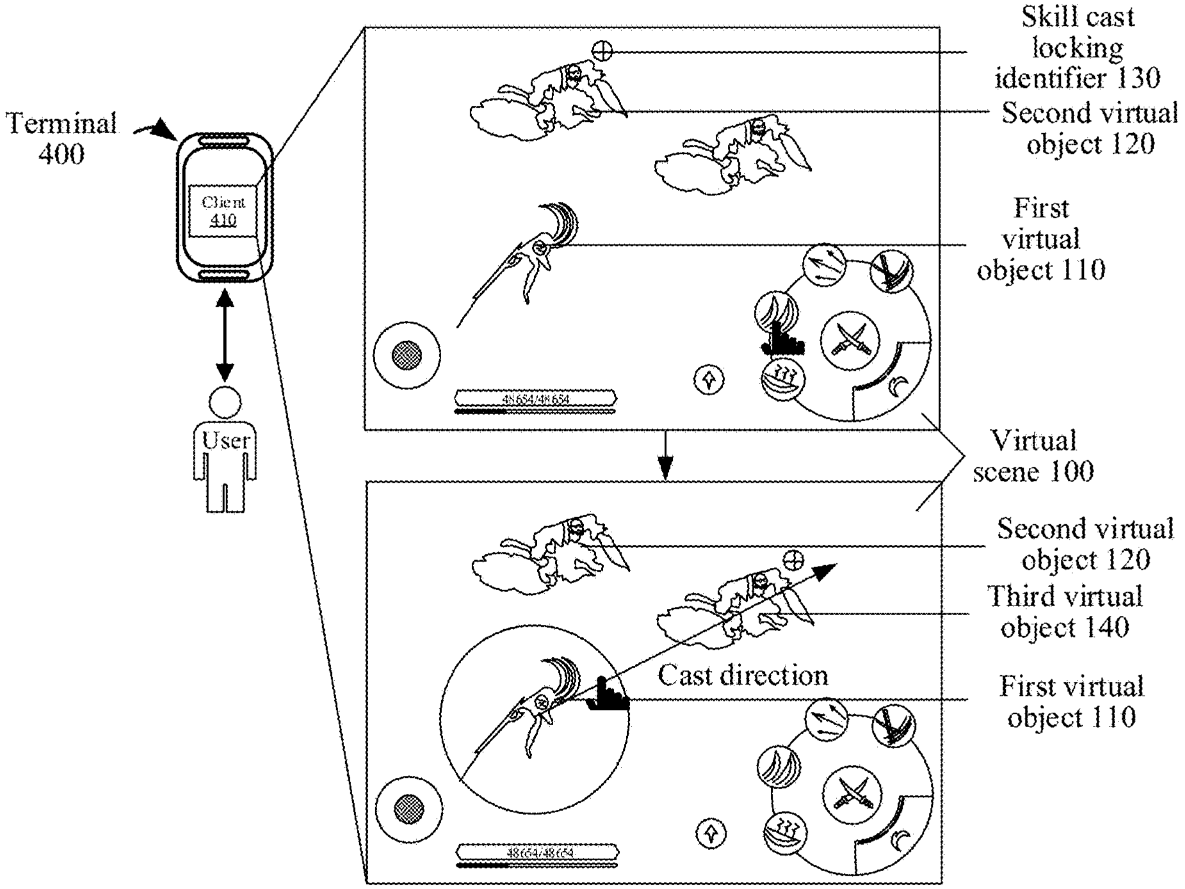
FIG. 1A and FIG. 1B are schematic diagrams of application modes of a virtual object control method according to an embodiment of this disclosure.

To make objectives, technical solutions, and advantages of this disclosure clearer, the following describes this disclosure in further detail with reference to the accompanying drawings. The described embodiments are not to be considered as a limitation to this disclosure. Other embodiments are within the scope of this disclosure.

In the following description, "some embodiments" describe subsets of all possible embodiments, but it may be understood that the "some embodiments" may include the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as those usually understood by a person skilled in the art to which this disclosure belongs. In this disclosure, terms used in the specification of this disclosure are merely intended to describe objectives of the exemplary embodiments and are not intended to limit this disclosure.

Before the embodiments of this disclosure are further described in detail, nouns and terms involved in the embodiments of this disclosure are described. The nouns and terms provided in the embodiments of this disclosure are applicable to the following explanations.

1) The expression "in response to" may be used for representing a condition or state on which one or more to-be-performed operations depend. In a case that the condition or state is met, the one or more operations may be performed immediately or have a set delay. Unless otherwise specified, there is no chronological order between the plurality of to-be-performed operations.

2) Client may refer to an application run on a terminal and configured to provide various services, for example, a game client, and the like.

3) Virtual scene may be a virtual game scene displayed (or provided) by a game application when run on a terminal. The virtual scene may be a simulated environment of a real world, or may be a semi-simulated semi-fictional virtual environment, or may be an entirely fictional virtual environment. The virtual scene may include any one of a two-dimensional virtual scene, a 2.5-dimensional virtual scene, or a three-dimensional virtual scene, and the dimension of the virtual scene is not limited in the embodiments of this disclosure. For example, the virtual scene may include the sky, the land, the ocean, or the like. The land may include environmental elements such as the desert and a city. The user may control the virtual object to move in the virtual scene.

4) Virtual object may be a character of each person and thing that may perform interaction in the virtual scene, or a movable object in the virtual scene. The movable object may include a virtual character, a virtual animal, a cartoon character, or the like, for example, a character, an animal, a plant, an oil drum, a wall, or a stone displayed in a virtual scene. The virtual object may include a virtual image used for representing a user in the virtual scene. The virtual scene may include a plurality of virtual objects, and each virtual object has a shape and a volume in the virtual scene, and occupies some space in the virtual scene.

For example, the virtual object may be a player character controlled through an operation performed on a client, or may be an artificial intelligence (AI) character set in a virtual scene battle through training, or may be a non-player character (NPC) set in virtual scene interaction. For example, the virtual object may be a virtual character performing interaction in an adversarial manner in the virtual scene. For example, a quantity of virtual objects participating in the interaction in the virtual scene may be preset, or may be dynamically determined according to a quantity of clients participating in the interaction.

5) Scene data may represent various features represented by objects in a virtual scene during interaction, for example, may include positions of the objects in the virtual scene. The features may be of different types based on the type of the virtual scene. For example, in a virtual scene of a game, scene data may include a time of waiting required to configure various functions in the virtual scene (which depends on a quantity of times that the same function can be used in a specific time period), or may represent attribute values (or briefly referred to as state values) of various states of a game character, for example, including hit points (which is also referred to as red points) and magic points (which is also referred to as blue points), and the like.

6) User operation (or referred to as player operation) may include an operation performed on a virtual object in a virtual scene by a user, for example, controlling movement of the virtual object by using a joystick, tapping/clicking to cast a skill, and the like.

7) Virtual skill (which is briefly referred to as skill) may include a capability of a virtual object, and different skills have different actions and effects, for example, the virtual object moves, causes damage to an enemy, heal a teammate, and the like.

8) Target selection may include selection, before a skill is cast, of a target on which the skill is to act on (e.g., a virtual object), and based on different skills, the controlled virtual object may perform different operations such as turning to the target, moving to the target, and the like.

In the related art, target selection and switching for the skill are implemented through a unified rule, for example, in a process of casting the skill, a target closest to the controlled virtual object is selected, or a target is selected through other logic (e.g., the target is selected by tapping a screen). A target closest to the controlled virtual object is selected uniformly in a fan-shaped region corresponding to a joystick in a case that the user performs a joystick operation in the process of casting the skill.

However, implementing target selection and switching for the skill through the unified rule cannot adapt to actual requirements in the process of casting the skill, for example, different skill effects may correspond to different priorities for target selection. For example, a long-range ballistic skill facing the controlled virtual object has a higher target priority, and a short-range skill closer to the controlled virtual object has a higher target priority. As a result, the efficiency of selecting a target may be reduced, affecting simulation performance of immersive perception in a virtual scene, and wasting resources of graphics processing hardware.

In view of the foregoing technical problem, an embodiment of this disclosure provides a virtual object control method, which can improve efficiency of selecting a skill action target, thereby improving simulation performance of immersive perception of a virtual scene and resource utilization of graphics processing hardware. For ease of better understanding of the virtual object control method provided in this embodiment of this disclosure, an exemplary implementation scenario of the virtual object control method provided in this embodiment of this disclosure is first described. The virtual scene may be outputted completely based on the terminal, or may be outputted based on the terminal and the server in a cooperative manner.

In some embodiments, the virtual scene may be an environment for game characters to interact. For example, the game characters fight against with each other in the virtual scene, and interaction in the virtual scene may be performed by controlling an action of the virtual object, so that the user can relieve the stress in life during the game.

In an implementation scenario, referring to FIG. 1A, FIG. 1A is a schematic diagram of an application mode of a virtual object control method according to an embodiment of this disclosure, which is applicable to some application modes in which calculation of relevant data of a virtual scene 100 is implemented completely relying on a graphics processing hardware computing capability of the terminal 400, for example, a standalone/offline game completes the output of the virtual scene through a the terminal 400 such as a smart phone, a tablet computer, and a virtual reality/augmented reality device, and the like.

For example, the graphics processing hardware includes processing circuitry, such as a central processing unit (CPU) and a graphics processing unit (GPU).

In a case that visual perception of the virtual scene 100 is formed, the terminal 400 calculates, through graphics computing hardware, data required for display, completes loading, parsing, and rendering of the display data, and outputs a video frame capable of forming visual perception for the virtual scene on graphics output hardware, for example, displaying a two-dimensional video frame on a display screen of a smartphone, or projecting a video frame for implementing a three-dimensional display effect on lenses of augmented reality/virtual reality glasses. In addition, to enrich a perception effect, the device may also form one or more of auditory perception, tactile perception, motion perception, and taste perception through different hardware.

For example, the terminal 400 runs a client 410 (e.g., a standalone game application), and outputs a virtual scene including role-playing during running of the client 410. The virtual scene is an environment for game characters to interact, for example, may include a plain, a street, a valley, and the like for the game characters to fight against with each other. The virtual scene includes a first virtual object 110. The first virtual object 110 may be a game character controlled by a user (or referred to as a player), that is, the first virtual object 110 is controlled by the user, and moves in the virtual scene in response to an operation on a controller (including a touch screen, a voice operated switch, a keyboard, a mouse, and a joystick, and the like) by a real user, for example, in a case that the real user moves the joystick to the left, the virtual object may move to the left in the virtual scene or may stay still, jump, and use various functions (such as skills and props).

For example, in a case that the first virtual object 110 is controlled to implement a selection operation on a to-be-cast skill, a skill cast locking identifier 130 is displayed at a position of a second virtual object 120 matching a type of the skill. In a case that the user needs to change an object on which the skill is to act, the first virtual object 110 may be controlled to implement a direction setting operation on the skill, a third virtual object 140 is determined according to a cast direction in a case that there is a deviation between the set cast direction and the second virtual object 120 relative to a direction of the first virtual object 110, the display of the skill cast locking identifier 130 at the position of the second virtual object 120 is canceled, and the skill cast locking identifier 130 is displayed at a position of the third virtual object 140.

Figure 1B:
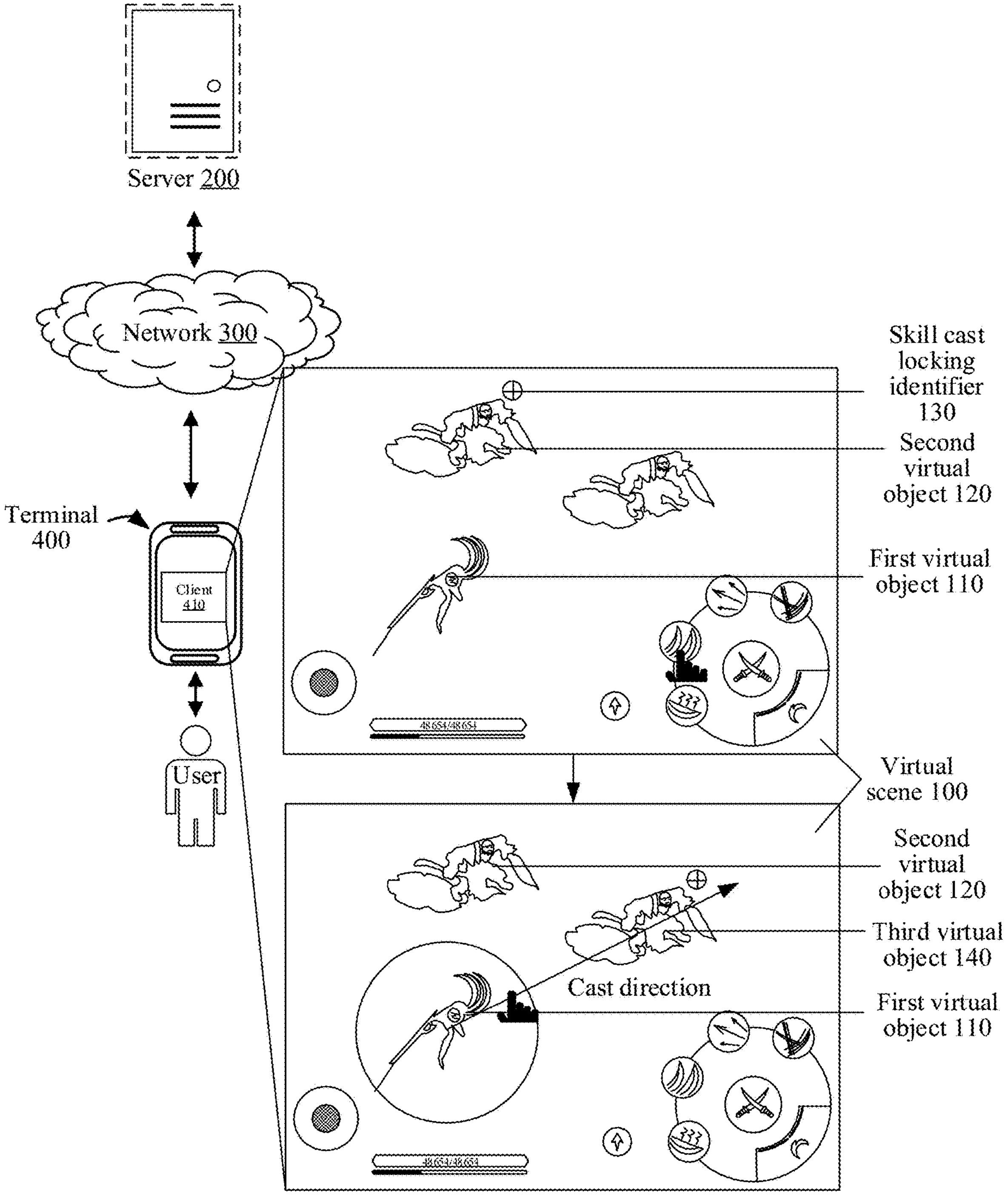

In another implementation scenario, referring to FIG. 1B, FIG. 1B is a schematic diagram of an application mode of a virtual object control method according to an embodiment of this disclosure, which is applied to the terminal 400 and the server 200, and is applicable to an application mode in which virtual scene calculation is completed relying on a computing capability of the server 200 and the virtual scene is outputted at the terminal 400.

Using an example in which visual perception of the virtual scene 100 is formed, the server 200 calculates display data related to the virtual scene and sends the calculation to the terminal 400 through a network 300, the terminal 400 relies on graphics computing hardware to complete loading, parsing, and rendering for calculating the display data, and relies on graphics output hardware to output the virtual scene to form visual perception, for example, a two-dimensional video frame may be presented on a display screen of a smartphone, or a three-dimensional video frame may be projected on lenses of augmented reality/virtual reality glasses. For perception in the form of the virtual scene, it may be understood that, the virtual scene may be outputted through corresponding hardware of the terminal, for example, auditory perception is formed by using a microphone output, tactile perception is formed by using a vibrator output, and the like.

For example, the terminal 400 runs the client 410 (e.g., an online game application), implements game interaction with other users by connecting to a game server (e.g., the server 200), and the terminal 400 outputs the virtual scene 100 of the client 410 including the virtual object 110 and a virtual object 120. The first virtual object 110 may be a game character controlled by a user, that is, the virtual object 110 is controlled by the user, and moves in the virtual scene in response to an operation on a controller (including a touch screen, a voice operated switch, a keyboard, a mouse, and a joystick, and the like) by a real user, for example, in a case that the real user moves the joystick to the left, the virtual object may move to the left or may stay still, jump, and use various functions (such as skills and props).

For example, in a case that the first virtual object 110 is controlled to implement a selection operation on a to-be-cast skill, a skill cast locking identifier 130 is displayed at a position of a second virtual object 120 matching a type of the skill. In a case that the user needs to change an object on which the skill is to act upon, the first virtual object 110 may be controlled to implement a direction setting operation on the skill, a third virtual object 140 is determined according to a cast direction in a case that there is a deviation between the set cast direction and the second virtual object 120 relative to a direction of the first virtual object 110, the display of the skill cast locking identifier 130 at the position of the second virtual object 120 is canceled, and the skill cast locking identifier 130 is displayed at a position of the third virtual object 140.

In some embodiments, the terminal 400 may implement the virtual object control method provided in this embodiment of this disclosure by running a computer program, for example, the computer program may include a native program or a software module in an operating system; a native application (APP), that is, an application that needs to be installed in the operating system for running, for example, a game APP (e.g., the foregoing client 410); a mini program, that is, a program that can be run simply by downloading the program into a browser environment; or may include a game mini program that can be embedded into any APP. Based on the above, the computer program may include an application, module, or plug-in in any form.

The embodiments of this disclosure may be implemented through a cloud technology. The cloud technology refers to a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources.

For example, the server 200 may include an independent physical server, or may include a server cluster including a plurality of physical servers or a distributed system, or may include a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 and the server 200 may be directly or indirectly connected in a wired or wireless communication manner. This is not limited in this embodiment of this disclosure.

Figure 2:
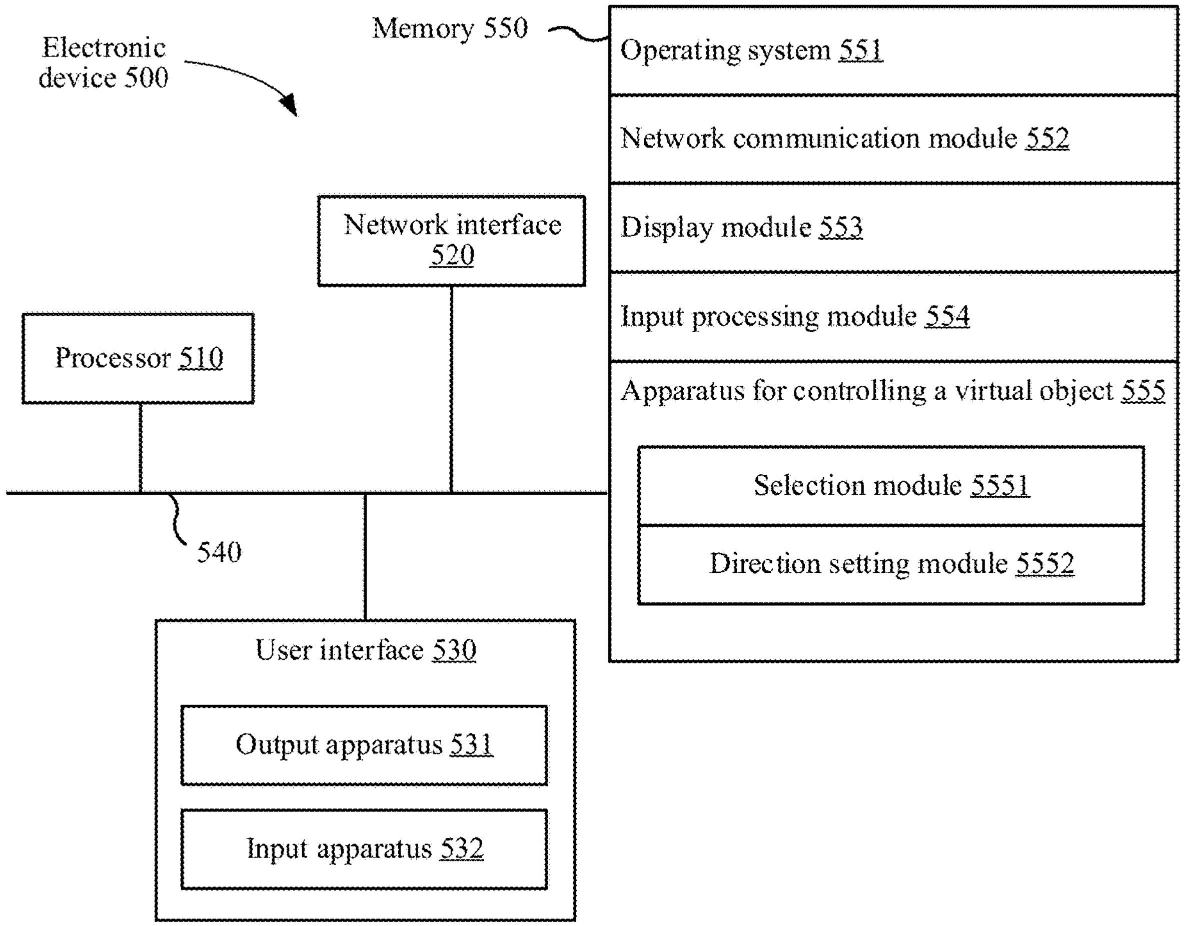
FIG. 2 is a schematic structural diagram of an electronic device 500 according to an embodiment of this disclosure.

The structure of an electronic device provided in this embodiment of this disclosure is described below. The electronic device may be a terminal 400 shown in FIG. 1A and FIG. 1B. Referring to FIG. 2, FIG. 2 is a schematic structural diagram of an electronic device 500 according to an embodiment of this disclosure. The electronic device 500 shown in FIG. 2 includes: at least one processor 510, a memory 550, at least one network interface 520, and a user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 2.

Processing circuitry, such as the processor 510, may include an integrated circuit chip having a signal processing capability, for example, a general purpose processor, a digital signal processor (DSP), or another programmable logic device (PLD), discrete gate, transistor logical device, or discrete hardware component. The general purpose processor may include a microprocessor, any processor, or the like.

The user interface 530 includes one or more output apparatuses 531 that enable presentation of media content, including one or more speakers and/or one or more visualization displays. The user interface 530 further includes one or more input apparatuses 532, including user interface components helping a user input, such as a keyboard, a mouse, a microphone, a touch display screen, a camera, and other input buttons and controls.

The memory 550 may include a removable memory, a non-removable memory, or a combination thereof. Exemplary hardware devices include a solid-state memory, a hard disk drive, an optical disc driver, or the like. The memory 550 may include one or more storage devices physically away from the processor 510.

The memory 550 includes a volatile memory or a non-volatile memory, or may include both a volatile memory and a non-volatile memory. The non-volatile memory may include a read-only memory (ROM), and the volatile memory may include a random access memory (RAM). The memory 550 described in the embodiments of this disclosure is to include any other suitable type of memories.

In some embodiments, the memory 550 may store data to support various operations. Examples of the data include programs, modules, and data structures, or a subset or a superset thereof. The descriptions are made below by using examples.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, Wi-Fi, a universal serial bus (USB), and the like.

A display module 553 is configured to display information by using an output apparatus 531 (e.g., a display screen or a speaker) associated with one or more user interfaces 530 (e.g., a user interface configured to operate a peripheral device and display content and information).

An input processing module 554 is configured to detect one or more user inputs or interactions from one of the one or more input apparatuses 532 and translate the detected input or interaction.

In some embodiments, a virtual object control apparatus provided in this embodiment of this disclosure may be implemented in a form of a software. FIG. 2 shows a virtual object control apparatus 555 stored in the memory 550, where the apparatus may include software such as a program and a plug-in, for example, a game program, and the like. The virtual object control apparatus 555 includes the following software modules: a selection module 5551 and a direction setting module 5552. Such modules are logical, and therefore may be combined in various manners or further divided according to implemented functions. A function of each module is described below.

The virtual object control method provided in this embodiment of this disclosure may be separately performed by the terminal 400 shown in FIG. 1A, or may be cooperatively performed by the terminal 400 and the server 200 shown in FIG. 1B.

Figure 3:
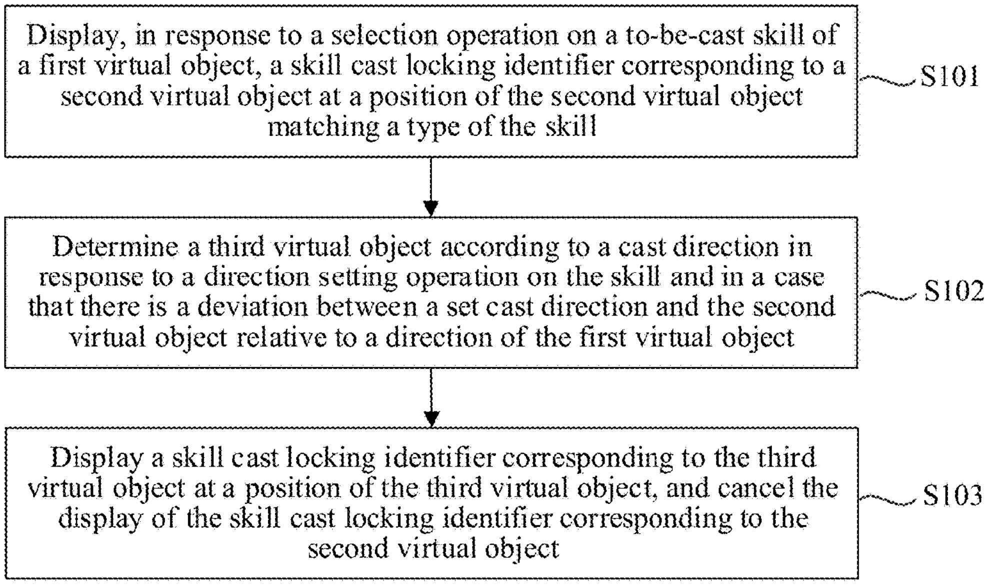
FIG. 3 is a flowchart of a virtual object control method according to an embodiment of this disclosure.

The description is made below by using an example in which the virtual object control method provided in this embodiment of this disclosure is separately performed by the terminal 400 shown in FIG. 1A. Referring to FIG. 3, FIG. 3 is a schematic flowchart of a virtual object control method according to an embodiment of this disclosure. The description is made below with reference to steps shown in FIG. 3.

The method shown in FIG. 3 may be performed by a computer program of various forms running on the terminal 400, which is not limited to the foregoing client 410, for example, the operating system 551, the software modules, and scripts.

In step S101, a skill cast locking identifier corresponding to a second virtual object is displayed, in response to a selection operation on a to-be-cast skill of a first virtual object, at a position of the second virtual object matching a type of the skill. In an example, a second virtual object is determined as a target virtual object of the function based on a type of the selected function.

In some embodiments, the skill cast locking identifier corresponding to the second virtual object is used for representing that the skill may act on the second virtual object in a case that the first virtual object casts the skill.

In some embodiments, the skill cast locking identifier corresponding to the second virtual object may be displayed in a region above, below, left, or right of the position of the second virtual object.

Figure 9A:
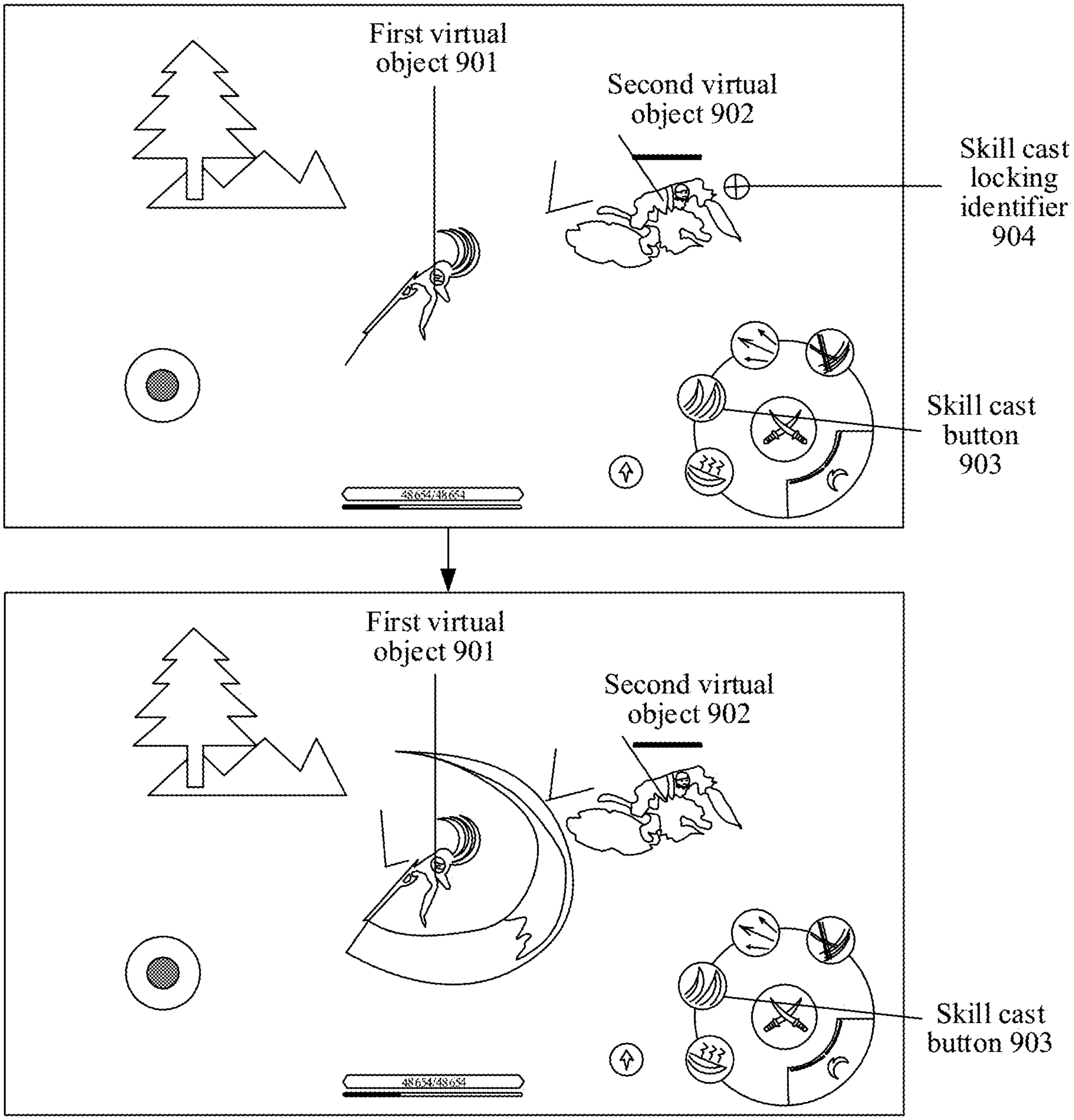
FIGS. 9A-9E are schematic diagrams of an application scenario of a virtual object control method according to an embodiment of this disclosure.

For example, in FIG. 9A, a user may select a to-be-cast skill of a first virtual object 901 by tapping a skill cast button 903, and after tapping the skill cast button 903, a second virtual object 902 matching a type of the skill selected by the user is automatically selected, and a skill cast locking identifier 904 is displayed on the right of the second virtual object 902.

In some embodiments, the skill of the first virtual object may be a capability of the first virtual object, or may be a capability owned by holding a virtual prop. The skill of the first virtual object may be used for performing an assisting behavior, for example, assisting or increasing health points. The skill of the first virtual object may also be used for performing a confrontational behavior, for example, attacking an enemy or destroying a virtual vehicle.

Figure 6A:
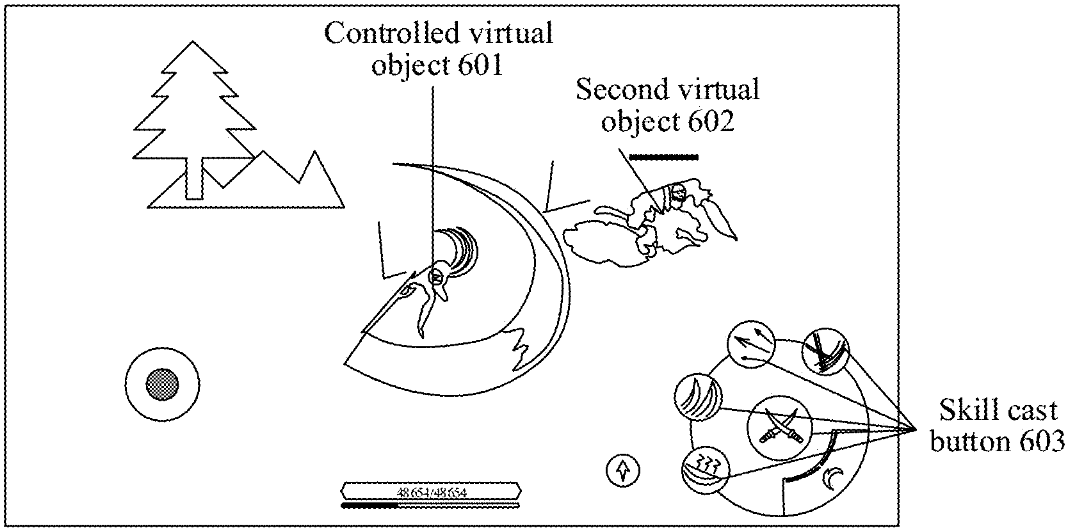
FIG. 6A and FIG. 6B are schematic diagrams of an application scenario of a virtual object control method according to an embodiment of this disclosure.

For example, in FIG. 6A, a controlled virtual object 601 includes a plurality of skills of different types, and the user may select a to-be-cast skill by tapping a skill cast button 603.

In some embodiments, the virtual scene may also be displayed on a human-computer interaction interface before responding to the selection operation on the to-be-cast skill of the first virtual object.

The virtual scene includes at least the first virtual object and the second virtual object.

For example, the virtual scene may be displayed on the human-computer interaction interface from a first-person perspective (e.g., playing the first virtual object in the game from a perspective of the player); the virtual scene may be displayed from a third-person perspective (e.g., the player runs after the first virtual object to play the game); or the virtual scene may be displayed from a bird's eye view. The foregoing perspectives may be randomly switched.

For example, the first virtual object may be an object controlled by the user in the game. The virtual scene may also include other virtual objects which may be controlled by other users or by a computer program, or artificial intelligence. The first virtual object may be divided into any one of a plurality of teams, the teams may be in an opposing relationship or a cooperative relationship, and teams in the virtual scene may include one or both the foregoing relationships.

Using an example in which the virtual scene is displayed from the first-person perspective, the virtual scene displayed on the human-computer interaction interface may include: determining a field of view region of the first virtual object according to a viewing position and a field of view of the first virtual object in an entire virtual scene, and presenting a part of the virtual scene in the field of view region in the entire virtual scene, that is, the displayed virtual scene may be a part of the virtual scene relative to a panoramic virtual scene. The first-person perspective is a viewing perspective that brings the most impact for the user. In this way, user's immersive perception during the operation can be achieved.

Using an example in which the virtual scene is displayed from a bird's-eye view, the virtual scene displayed on the human-computer interaction interface may include: presenting a part of the virtual scene corresponding to a zooming operation on the human-computer interaction interface in response to the zooming operation on a panoramic virtual scene, that is, the displayed virtual scene may be a part of the virtual scene relative to the panoramic virtual scene. In this way, the operability of the user during the operation can be improved, thereby improving the efficiency of human-computer interaction.

In some embodiments, after step S101, the skill may be cast to the second virtual object in a case that a display duration of the skill cast locking identifier of the second virtual object exceeds a duration threshold; or the skill may be cast to the second virtual object in response to a cast operation on the skill.

For example, a direction setting operation received in step S102 may be received in a process of casting the skill to the second virtual object, or may be received before the skill is cast. The timing of receiving the direction setting operation may vary according to different skills. For example, some skills may determine a skill action target before the skill is cast, and the target may not be changed after the skill is cast. Some combo skills can select a new target in the middle of the combo for switching; For some slashing skills, the skill may be normally cast when a knife is lifted, and the skill action target may be selected according to the user operation at the moment after the knife is swung.

For example, the duration threshold may be a default value, or may be a value set by the user, the client, or the server. The cast operation on the skill and the selection operation on the to-be-cast skill may be continuous. For example, selection operation on the to-be-cast skill is to press the skill cast button without releasing, a skill corresponding to the pressed skill cast button is a to-be-cast skill selected by the user, and the cast operation on the skill may be an operation to release pressing.

For example, in FIG. 9A, the skill is cast to the second virtual object 902 in a case that the user releases pressing of the skill cast button 903, and the display of the skill cast locking identifier 904 on the right of the second virtual object 902 is canceled. In this way, continuity of the user operation can be improved, thereby improving the efficiency of operation.

Figure 4:
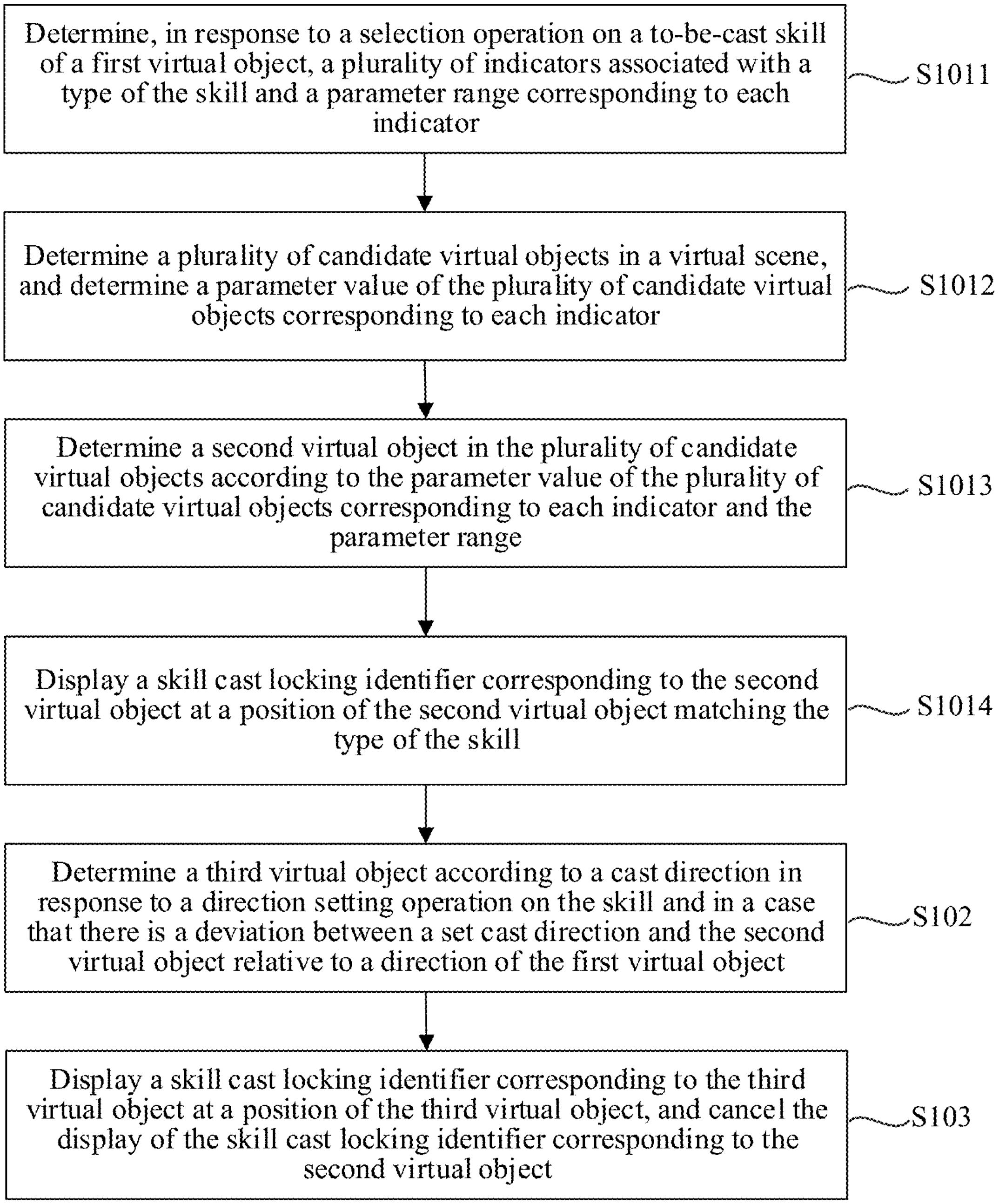
FIG. 4 is a flowchart of a virtual object control method according to an embodiment of this disclosure.

In some embodiments, referring to FIG. 4, FIG. 4 is a schematic flowchart of a virtual object control method according to an embodiment of this disclosure. Based on FIG. 3, step S101 may include step S1011 to step S1014.

In step S1011, a plurality of indicators associated with the type of the skill and a parameter range corresponding to each indicator are determined in response to the selection operation on the to-be-cast skill of the first virtual object.

In some embodiments, a type of the indicator includes: a direction, a distance, a health status (e.g., health points), and a defense capability.

Using an example in which the type of indicator is a direction, a parameter range corresponding to the direction is measured by an angle of the virtual object relative to the first virtual object. For example, in FIG. 7A, in a coordinate system with a positive orientation of the controlled virtual object (e.g., the foregoing first virtual object) as a positive direction, an angle θ is a parameter range corresponding to the direction. In this way, the skill can be cast to a virtual object facing the user.

Using an example in which the type of indicator is a distance, a parameter range corresponding to the distance is measured by a distance (or length) between the virtual object and the first virtual object. For example, in FIG. 7A, in a coordinate system with the controlled virtual object as an origin, distances L1 and L2 are parameter ranges corresponding to the distance. In this way, the skill can be cast to a virtual object closer to the user.

Using an example in which the type of indicator is a health status, a parameter range corresponding to the health status is measured by a health status of the virtual object. For example, a parameter range corresponding to the health status is (0,100), and a virtual object with health points lower than 100 is within the parameter range. In this way, the skill can be cast to a virtual object with lower health points, thereby improving effectiveness of confrontation or assistance.

Using an example in which the type of indicator is a defense capability, a parameter range corresponding to the defense capability is measured by a defense capability of the virtual object. For example, a parameter range corresponding to the defense capability is (0,100), and a virtual object with a defense value lower than 100 is within the parameter range. In this way, the skill can be cast to a virtual object with a poor defense capability, thereby improving effectiveness of confrontation or assistance.

In step S1012, a plurality of candidate virtual objects in a virtual scene are determined, and a parameter value of the plurality of candidate virtual objects corresponding to each indicator is determined.

In some embodiments, in a case that the skill is used for performing a confrontational behavior (e.g., attacking), virtual objects (e.g., enemies) of a group fighting against a group to which the first virtual object belongs in the virtual scene are determined as the candidate virtual objects. In this way, accidental damage to teammates may be avoided in a process of casting the skill for performing the confrontational behavior, thereby improving accuracy of target selection.

In some embodiments, in a case that the skill is used for performing an assisting behavior (e.g., increasing health points or assisting), virtual objects (e.g., teammates) that belong to the same group as the first virtual object in the virtual scene are determined as the candidate virtual objects. In this way, accidental assistance to the enemies may be avoided in a process of casting the skill for performing the assisting behavior, thereby improving accuracy of target selection.

In step S1013, the second virtual object in the plurality of candidate virtual objects is determined according to the parameter value of the plurality of candidate virtual objects corresponding to each indicator and the parameter range.

In some embodiments, a candidate virtual object whose parameter value corresponding to the indicators is within the parameter range is determined from the plurality of candidate virtual objects as the second virtual object.

For example, there may be a plurality of candidate virtual objects within the parameter range. Therefore, the second virtual object may be determined from the plurality of candidate virtual objects whose parameter values corresponding to the indicators are all within the parameter range according to a priority of a plurality of indicators associated with the type of the skill.

For example, the type of the skill is associated with a priority indicator, and the priority indicator is one of the plurality of indicators associated with the type of the skill that has a highest priority; candidate virtual objects whose parameter values corresponding to the indicators are all within the parameter range are determined in the plurality of candidate virtual objects; and the determined candidate virtual objects are sorted in ascending order of a parameter value corresponding to the priority indicator, and a part of the candidate virtual objects ranked top (one or more) in an ascending sorting result is determined as the second virtual object.

For example, in a long-range ballistic skill, a direction indicator is a priority indicator, that is, a candidate virtual object facing the first virtual object is preferentially selected as the second virtual object; and in a short-range ballistic skill, a distance indicator is a priority indicator, that is, a candidate virtual object with a shorter distance is preferentially selected as the second virtual object.

In this embodiment of this disclosure, a target closest to that the user intends to attack can be selected as a target to which the skill is cast, so that different types of skills of the user can hit the target most desired to hit, thereby improving the efficiency of target selection.

For example, the indicator associated with the type of the skill includes a direction and a distance; a parameter range corresponding to the direction includes a first direction range; and a parameter range corresponding to the distance includes a first distance range and a second distance range, a priority of the first distance range being higher than a priority of the second distance range; and In this way, candidate virtual objects within the first direction range relative to the first virtual object and within the first distance range relative to the first virtual object are determined in the plurality of candidate virtual objects; and candidate virtual objects within the first direction range relative to the first virtual object and within the second distance range relative to the first virtual object are determined in a case that there is no virtual object within the first direction range relative to the first virtual object and within the first distance range relative to the first virtual object.

Figure 7A:
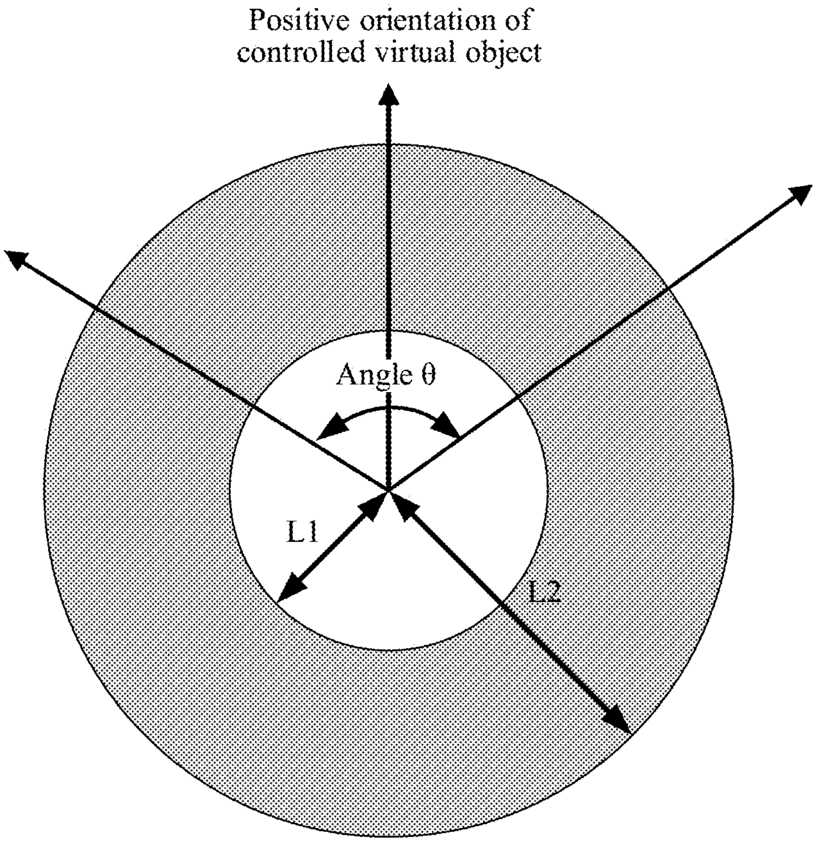
FIGS. 7A-7C are schematic principle diagrams of a virtual object control method according to an embodiment of this disclosure.

For example, in FIG. 7A, a coordinate system is determined by using a position of the controlled virtual object (e.g., the foregoing first virtual object) as an origin and using a positive orientation of the controlled virtual object as a positive direction. An enemy closest to the controlled virtual object is searched within a range with an angle of θ and a distance of L1 (that is, a distance between the target and the controlled virtual object is L1) as a target of the skill. In a case that there is no enemy within the range with the angle of θ and the distance of L1, an enemy closest to the controlled virtual object is searched within a range with an angle of θ and a distance of L2 (e.g., a distance between the target and the controlled virtual object is L2) as a target of the skill. In a case that there is still no enemy within the range of with the distance of L2, a result of target selection at this time is that there is no target. θ, L1, and L2 are configuration parameters, 0°<0<360°, L1>0, and L2>0.

In step S1014, a skill cast locking identifier corresponding to a second virtual object is displayed at a position of the second virtual object matching a type of the skill.

For example, in FIG. 9A, the second virtual object 902 matches the type of the skill, and therefore the skill cast locking identifier 904 is displayed on the right of the second virtual object 902, to prompt that the skill may act on the second virtual object 902 in a case that the first virtual object 901 casts the skill.

In step S102, a third virtual object is determined according to a cast direction in response to a direction setting operation on the skill and in a case that there is a deviation between the set cast direction and the second virtual object relative to a direction of the first virtual object. In an example, whether the target virtual object of the function is to be changed to a third virtual object is determined based on a direction setting operation.

For example, the direction setting operation may be a joystick operation or a tapping operation corresponding to the direction.

In some embodiments, a virtual object in the cast direction and closest to the first virtual object is determined as the third virtual object in a case that an angle deviation between the cast direction and the second virtual object relative to the direction of the first virtual object is greater than a deviation threshold. In this way, in a process of casting a skill by the user, a most suitable skill target can be selected according to skills of different types and a direction setting operation by the user, thereby improving the efficiency of target selection.

For example, in a case that the skill is used for performing a confrontational behavior, the third virtual object and the first virtual object belong to different groups fighting against with each other; and the third virtual object and the first virtual object belong to the same group in a case that the skill is used for performing an assisting behavior.

For example, a deviation threshold may be a default value, or may be a value set by the user, the client, or the server, or may be a deviation value based on a user operation.

Figure 7B:
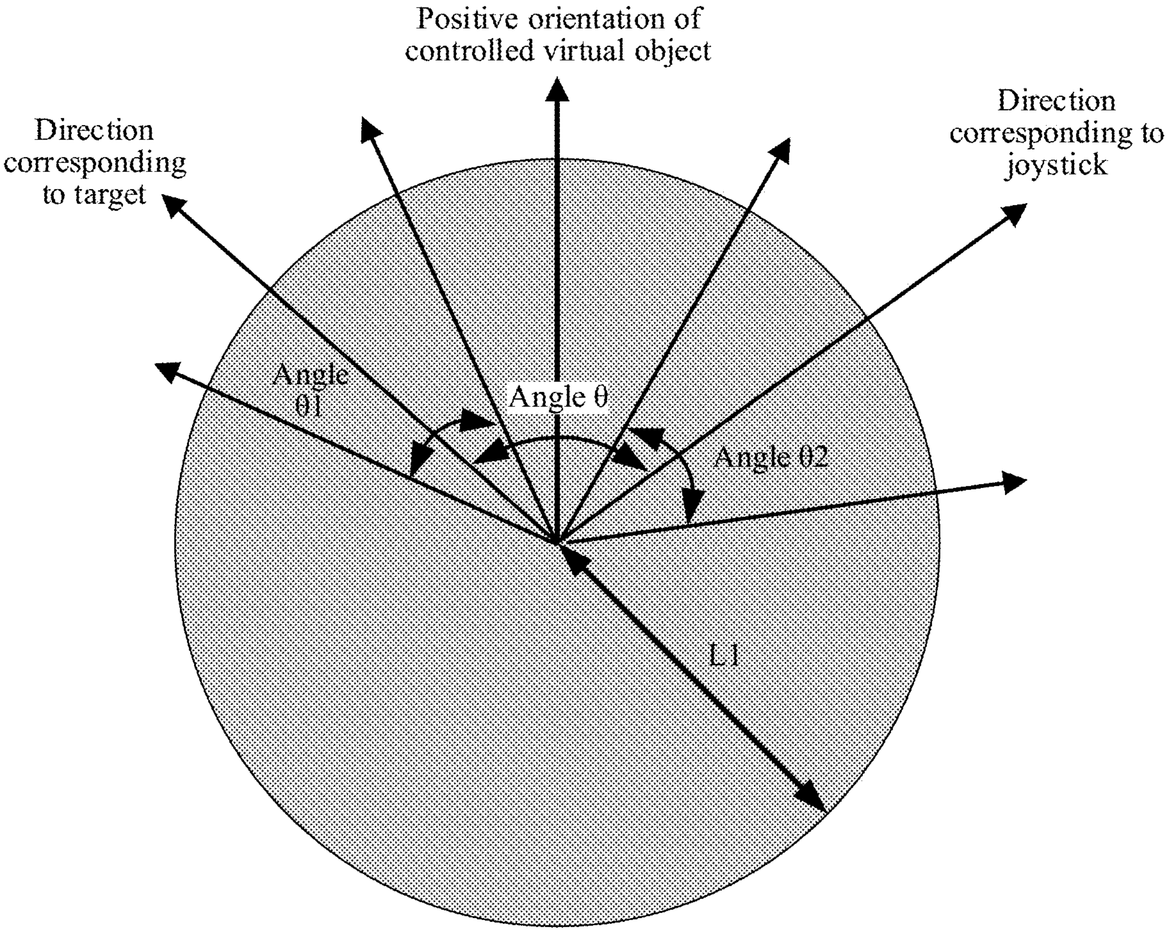
Figure 7C:
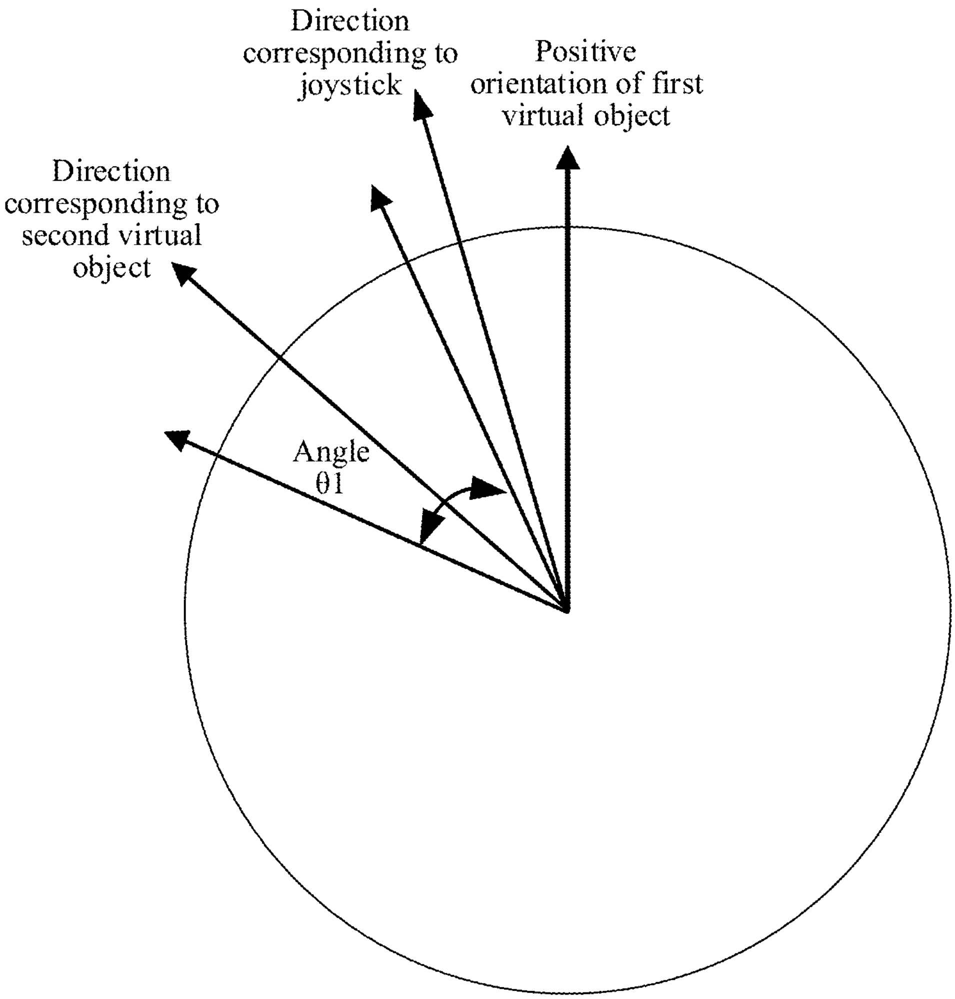

For example, in FIG. 7C, θ1/2 is a deviation threshold, and an angle deviation between a direction corresponding to the joystick (e.g., the foregoing cast direction) and a direction corresponding to the second virtual object (e.g., a direction of the second virtual object relative to the first virtual object) is greater than θ1/2. In view of this, the third virtual object needs to be determined according to the direction corresponding to the joystick.

In some embodiments, after responding to the direction setting operation on the skill, prompt information for prompting to reset the cast direction is displayed in a case that an angle deviation between the cast direction and the second virtual object relative to the direction of the first virtual object is greater than a deviation threshold and there is no virtual object on which the skill can act in the cast direction.

For example, in a case that the skill is used for performing a confrontational behavior, a virtual object on which the skill can act and the first virtual object belong to different groups fighting against with each other; and the third virtual object on which the skill can act and the first virtual object belong to the same group in a case that the skill is used for performing an assisting behavior.

Figure 9B:
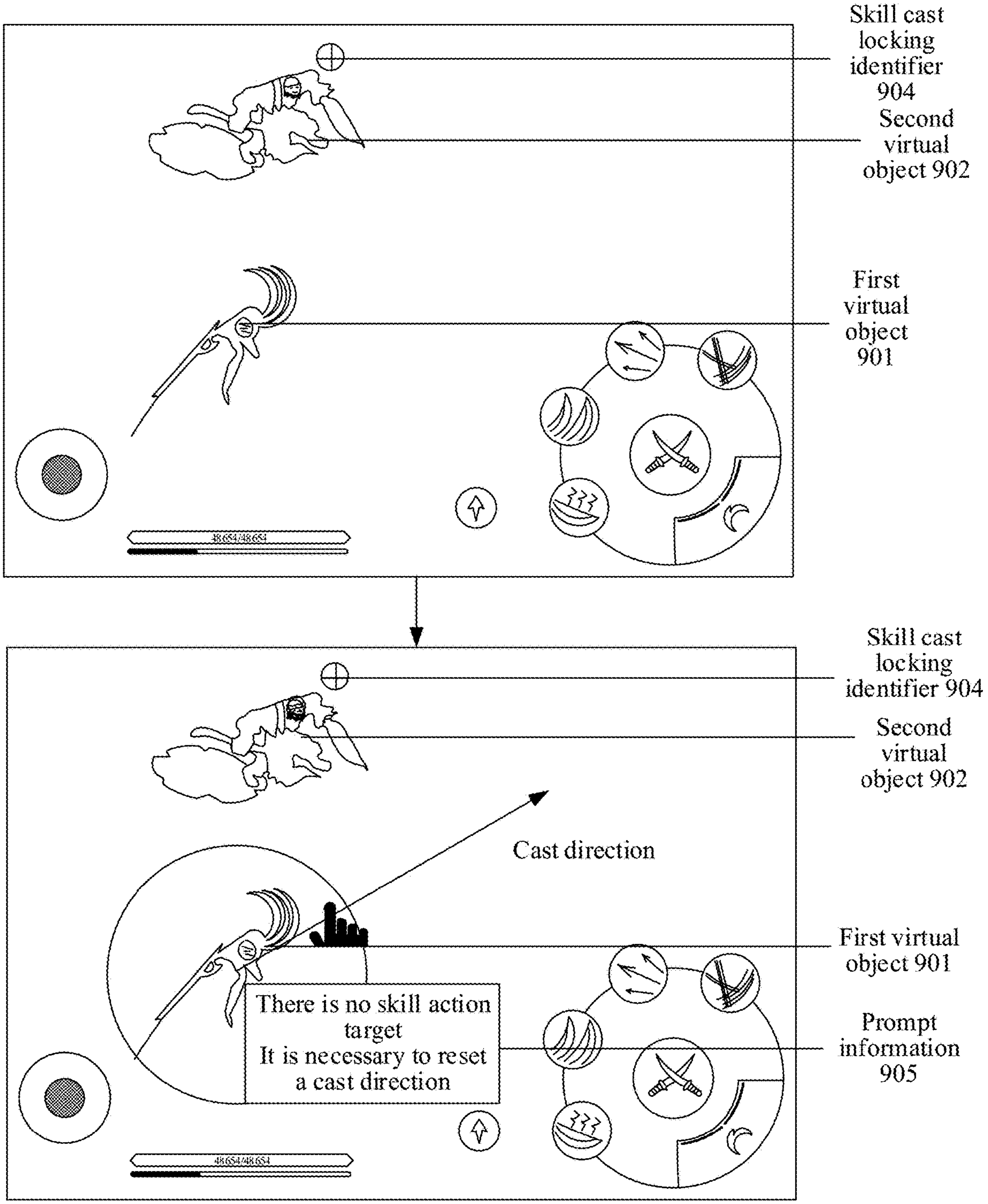

For example, in FIG. 9B, in a case that after performing a joystick operation, the user finds that there is no enemy that can be attacked or a teammate than can be assisted in a redetermined cast direction, prompt information 905 is displayed to prompt the user to reset the cast direction.

In some embodiments, after responding to the direction setting operation on the skill, the skill cast locking identifier corresponding to the second virtual object may further continue to be displayed at the position of the second virtual object in a case that an angle deviation between the cast direction and the second virtual object relative to the direction of the first virtual object is greater than a deviation threshold and there is no virtual object on which the skill can act in the cast direction.

For example, in FIG. 9B, in a case that after performing a joystick operation, the user finds that there is no enemy that can be attacked or a teammate than can be assisted in a redetermined cast direction, the skill cast locking identifier 904 continues to be displayed on the right of the second virtual object 902 to determine the second virtual object 902 as an action target after the skill is cast. In this way, the skill can be ensured not to be wasted, thereby improving accuracy of skill action.

In some embodiments, first prompt information may further be displayed in response to the direction setting operation on the skill and in a case that the set cast direction is within a second direction range, the first prompt information being used for prompting that a virtual object on which the skill is to act may be determined again according to the set cast direction.

Figure 9C:
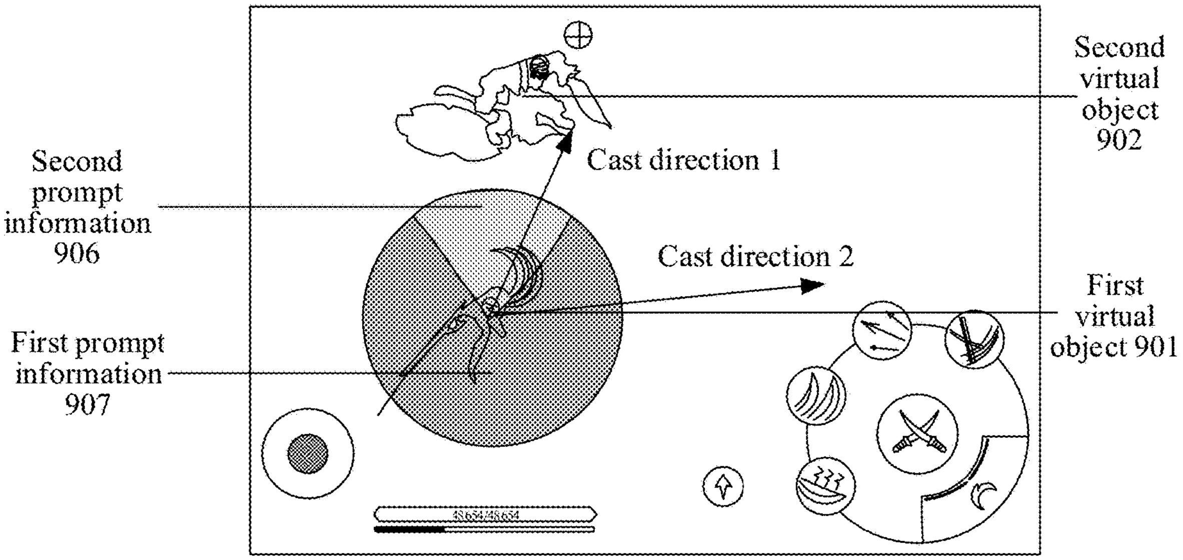

For example, in FIG. 9C, a direction wheel is displayed with the first virtual object 901 as a center point, and prompt information of different colors is displayed in the direction wheel, where first prompt information 907 in the direction wheel is used for prompting that the virtual object on which the skill acts may be determined again according to the set cast direction, and a direction range corresponding to the first prompt information 907 is the foregoing second direction range. That is to say, the skill action target may be changed in a case that the cast direction is within the second direction range (a cast direction 2 in FIG. 9C), thereby improving the efficiency of the user operation.

In some embodiments, second prompt information is displayed in a case that the set cast direction is within a third direction range, the second prompt information being used for prompting that a virtual object on which the skill is to act is the second virtual object.

For example, in FIG. 9C, a direction wheel is displayed with the first virtual object 901 as a center point, and prompt information of different colors is displayed in the direction wheel, where second prompt information 906 in the direction wheel is used for prompting that the virtual object on which the skill is to act is still the second virtual object 902, and a direction range corresponding to the second prompt information 906 is the foregoing third direction range. That is to say, in a case that the cast direction is within the third direction range (a cast direction 1 in FIG. 9C), the skill action target may not be changed, and the second virtual object 902 is still continuously attacked, thereby improving the efficiency of the user operation.

In step S103, a skill cast locking identifier corresponding to the third virtual object is displayed at a position of the third virtual object, and the display of the skill cast locking identifier corresponding to the second virtual object is canceled. In an example, the third virtual object is determined as the target virtual object based on the target virtual object of the function being determined to be changed to the third virtual object.

In some embodiments, the skill cast locking identifier corresponding to the third virtual object is used for representing that the skill may act on the third virtual object in a case that the first virtual object causes the skill.

Figure 9D:
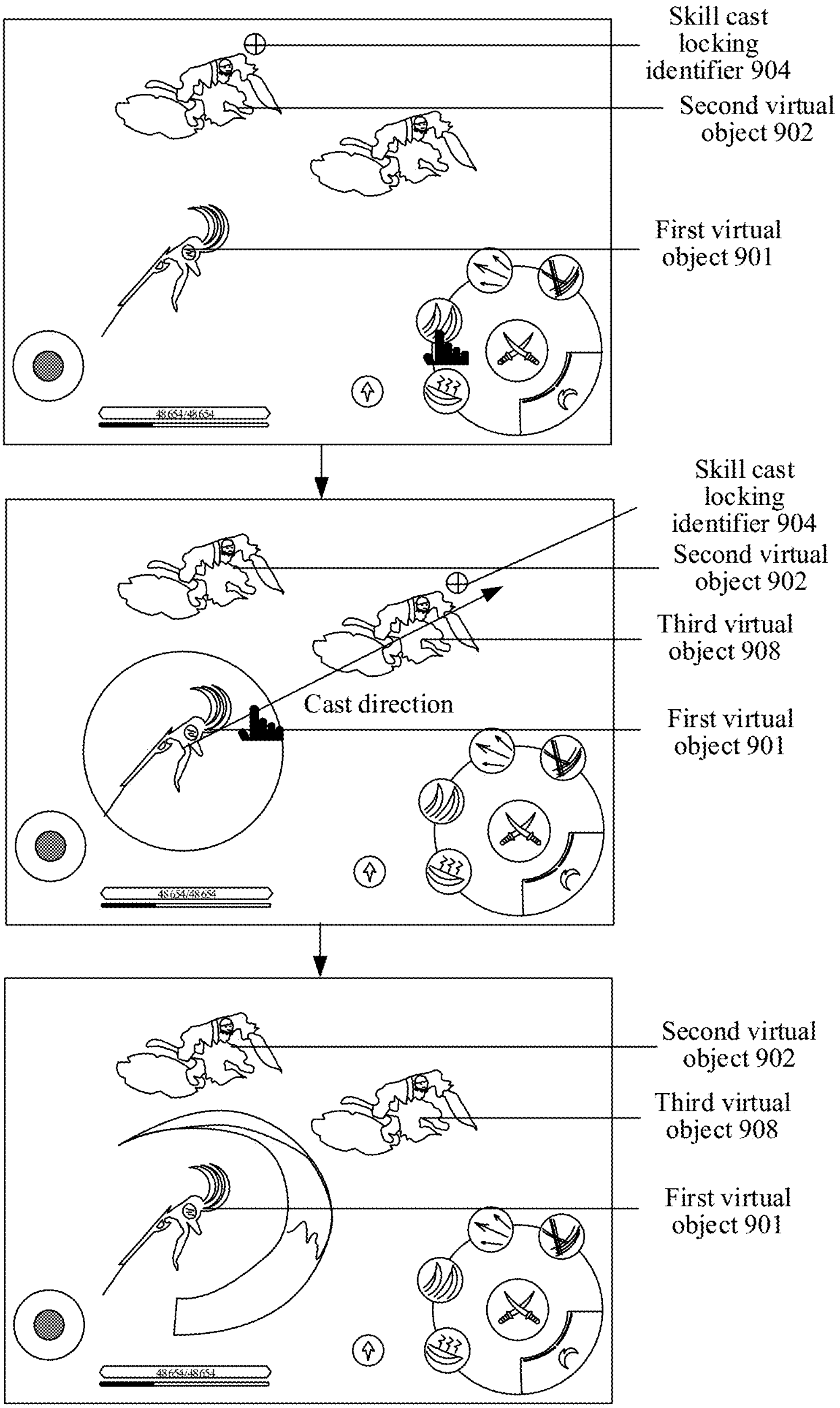

For example, in FIG. 9D, in a case that there is a deviation between a set cast direction selected by the user and the second virtual object 902 relative to a direction of the first virtual object 901, a third virtual object 908 is determined according to the cast direction, the skill cast locking identifier 904 is displayed on the right of the third virtual object 908, and the display of the skill cast locking identifier 904 of the second virtual object 902 is canceled, to determine the third virtual object 908 as an action target after the skill is cast.

In some embodiments, after step S101, a skill cast locking identifier corresponding to a fifth virtual object may further be displayed at a position of the fifth virtual object in response to an object setting operation on the skill, and the display of the skill cast locking identifier corresponding to the second virtual object is canceled, the fifth virtual object being a virtual object set by performing the object setting operation.

Figure 9E:
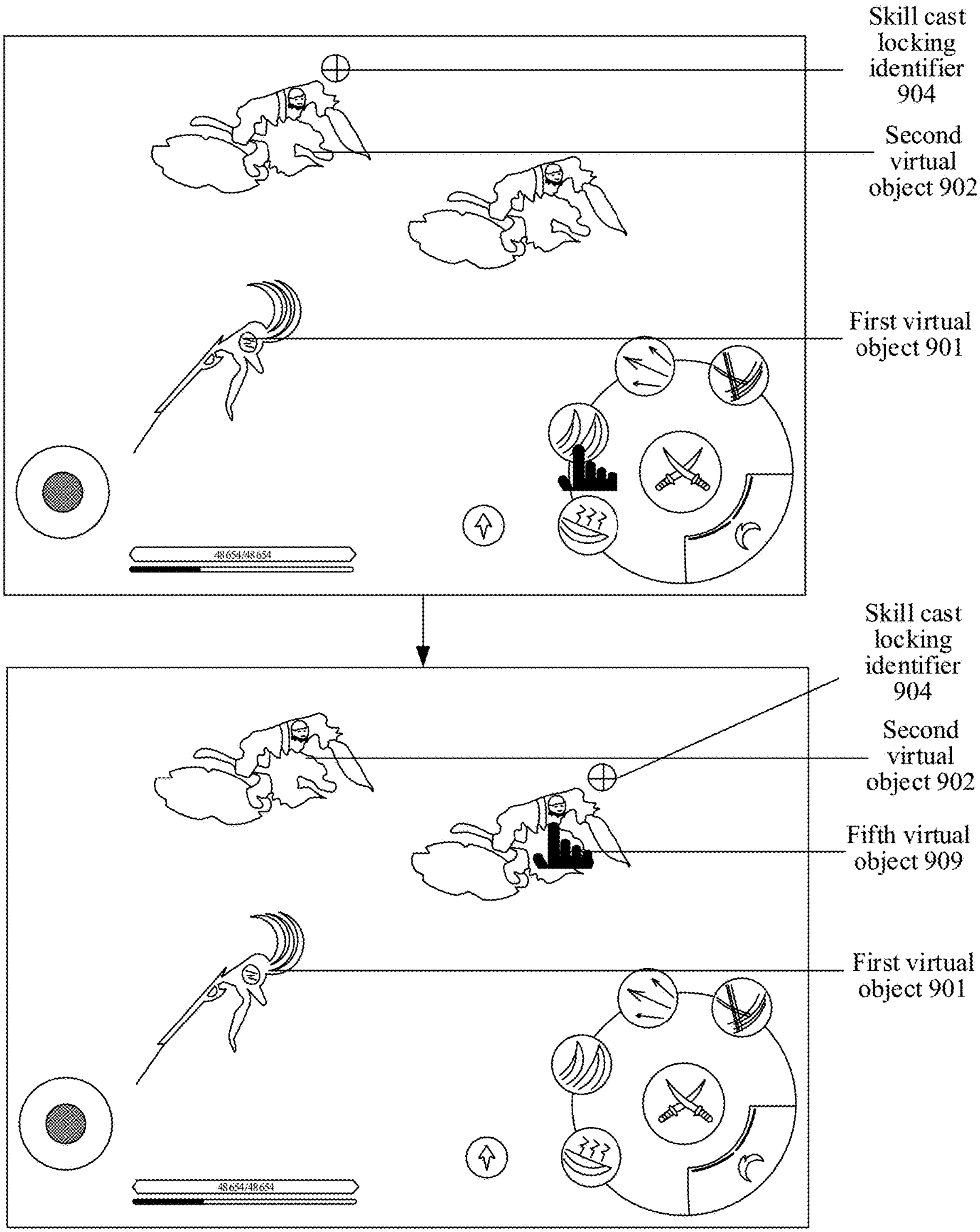

For example, the object setting operation may be a trigger operation (e.g., the tapping operation) on the virtual object. For example, in FIG. 9E, in a case that the user taps a fifth virtual object 909, the skill cast locking identifier 904 is displayed on the right of the fifth virtual object 909, and the display of the skill cast locking identifier 904 on the right of the second virtual object 902 is canceled, to determine the fifth virtual object 909 as an action target after the skill is cast, thereby improving diversity of a target switching operation.

Figure 5:
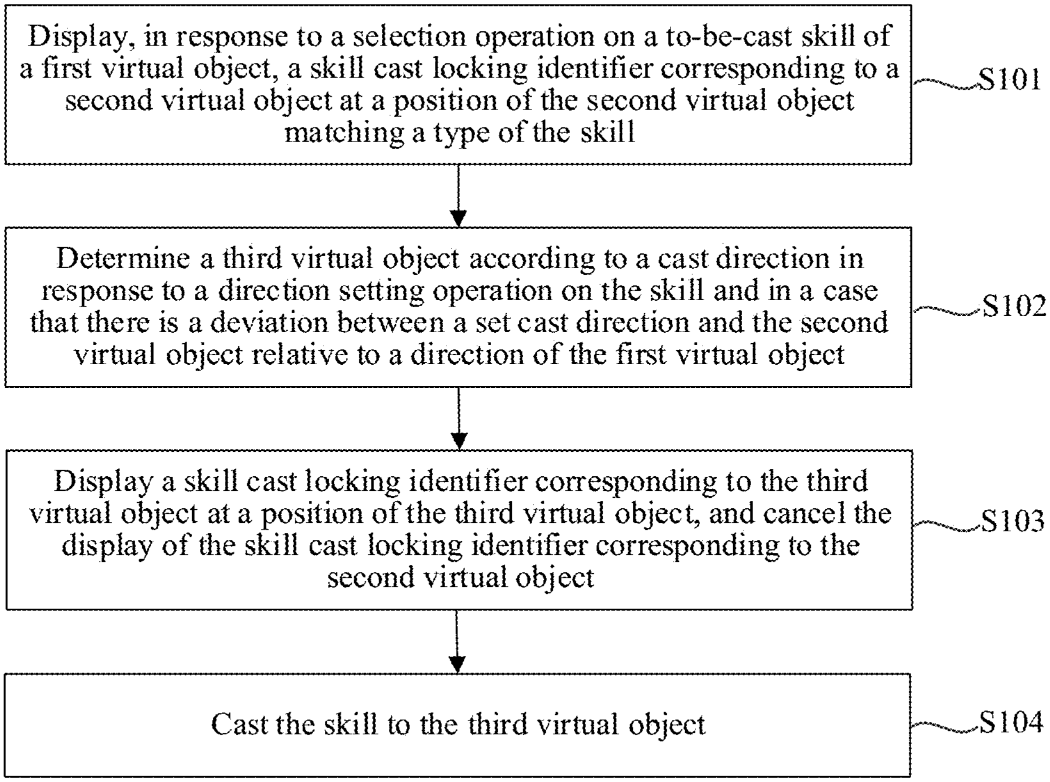
FIG. 5 is a flowchart of a virtual object control method according to an embodiment of this disclosure.

In some embodiments, referring to FIG. 5, FIG. 5 is a schematic flowchart of a virtual object control method according to an embodiment of this disclosure. Based on FIG. 3, after step S103, the method may further include step S104.

In step S104, the skill is cast to the third virtual object.

In some embodiments, the skill is cast to the third virtual object in a case that a display duration of the skill cast locking identifier of the third virtual object exceeds a duration threshold; or the skill is cast to the third virtual object in response to a cast operation on the skill.

For example, the duration threshold may be a default value, or may be a value set by the user, the client, or the server. The cast operation on the skill and the selection operation on the to-be-cast skill may be continuous. For example, selection operation on the to-be-cast skill is to press the skill cast button without releasing, a skill corresponding to the pressed skill cast button is a to-be-cast skill selected by the user, and the cast operation on the skill may be an operation to release pressing.

For example, in FIG. 9D, the skill is cast to the third virtual object 908, and the display of the skill cast locking identifier 904 on the right of the third virtual object 908 is canceled.

In some embodiments, after step S104, in response to a direction change operation on the skill and in a case that there is a deviation between a changed cast direction and the third virtual object relative to the direction of the first virtual object, a fourth virtual object is determined according to the changed cast direction in a process of casting the skill, and the skill is continued to be cast to the fourth virtual object.

For example, the direction change operation may be a joystick operation or a tapping operation corresponding to the direction. In this way, in the process of casting the skill to the third virtual object, a direction for casting the skill may also be changed to switch the action object to which the skill is cast.

The virtual object control method provided in this embodiment of this disclosure is described below by using an example in which the application scenario is a game and the skill is used for performing a confrontational behavior.

In this embodiment of this disclosure, in the process of casting the skill by the user, the joystick operation performed by the user and different cast skills are used as parameters for target selection, thereby implementing target selection and skill switching. Skills of different types have different priorities for target selection. For example, a long-range ballistic skill facing the controlled virtual object has a higher target priority, and a short-range skill closer to the controlled virtual object has a higher target priority. In this embodiment of this disclosure, the user may better select a more appropriate skill target according to the operation, thereby improving user's combat experience.

In some embodiments, the timing of target switching may vary according to different skills. For example, some skills can determine the switching target before the skill is cast, and the target may not be changed after the skill is cast. Some combo skills (e.g., skills that are implemented in stages, for example, a first sub-skill is implemented in a first time period, and a second sub-skill is implemented in a second time period, the second time period following the first time period, and so on) may select a new target in the middle of combo for switching. For example, the first sub-skill is cast to the second virtual object, and the user can switch the action target of subsequent sub-skills after the first sub-skill is cast. For some slashing skills, the skill may be normally cast when a knife is lifted, and the switching target may be selected according to the user operation at the moment after the knife is swung. In this way, in this embodiment of this disclosure, different target switching timings can be set according to different skills.

In some embodiments, the parameters of different skill configurations and the user's operation may be used as comprehensive parameters for calculation, a target closest to that the user intends to attack can be selected as a target to which the skill is cast (or referred to as a skill target), and then according to a selected target, the controlled virtual object is caused to turn to the target and cast the skill, so that different types of skills of the user can hit the target most desired to hit.

The application scenario in this embodiment of this disclosure includes: casting the skill in a case that different types of skills are cast and the user has different joystick operations. After applying the virtual object control method provided in this embodiment of this disclosure, skill targets may be different in a process of implementing different types of skills, and in a process of casting the skill, there may be different selections for the skill target in a case that the user performs the joystick operation.

Figure 6B:
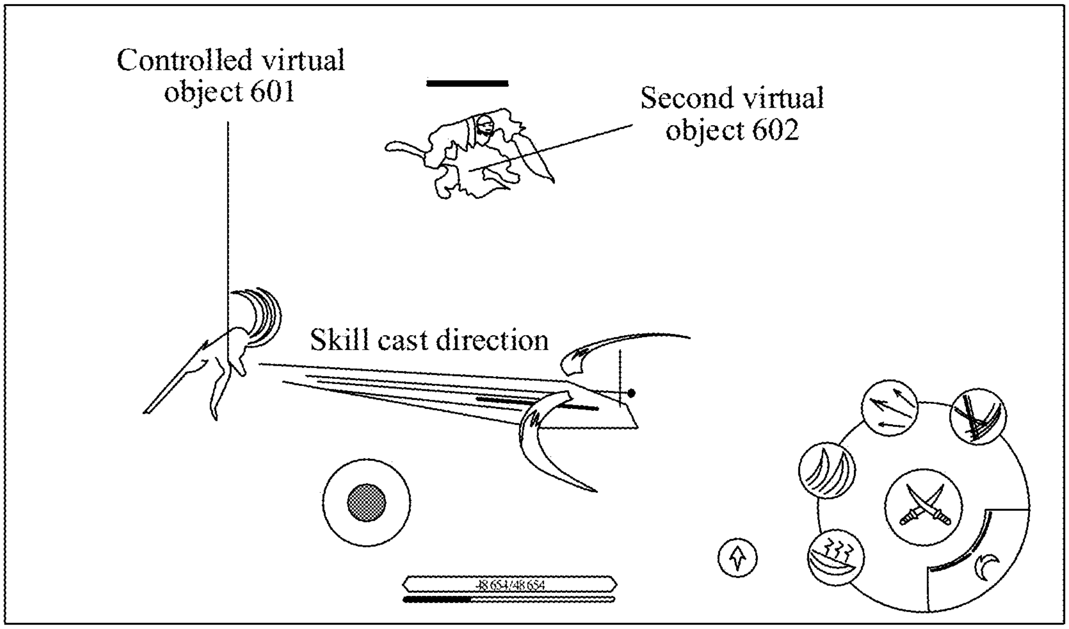

Referring to FIGS. 6A and 6B, FIGS. 6A and 6B are schematic diagrams of an application scenario of a virtual object control method according to an embodiment of this disclosure. An implementation of the virtual object control method provided in this embodiment of this disclosure is described with reference to FIGS. 6A and 6B.

(1) In a Case that there is No Joystick Operation

In some embodiments, when casting the skill, the controlled virtual object (e.g., the foregoing first virtual object) automatically selects a virtual object with a distance within 3 meters, an angle within 180° (where 3 meters and 180° are both configuration parameters, and different skills correspond to different parameters) and closest to the controlled virtual object as a target, and the controlled virtual object is turned to the target to cast the skill. In a case that there is no enemy (e.g., the virtual object of the group fighting against the group to which the controlled virtual object belongs) in such a region, the enemy closest to the user is selected as a target in a larger range.

In an example, two ranges and angles corresponding to different skills can be freely configured by the user, so that different skills can select suitable skill targets according to different priority ranges in a target selection process, so that a long-range ballistic skill facing the target has a higher priority, and a short-range skill close to the target has a higher priority, to cause the skill hit a target most desired to hit. For example, the long-range ballistic skill can be set with a smaller angle and a larger distance from the controlled virtual object, so that the long-range ballistic skill can preferentially attack the enemy facing the virtual object. The short-range skill can be set with a larger angle and a smaller distance from the controlled virtual object, so that the short-range skill can preferentially attack the enemy within a short distance.

For example, in FIG. 6A, in a case that the controlled virtual object 601 casts the short-range skill, the second virtual object 602 closest to the controlled virtual object 601 is automatically selected as a target, and the controlled virtual object 601 is turned to the second virtual object 602 to cast the skill.

(2) In a Case that there is a Joystick Operation

In some embodiments, when casting the skill, in a case that the user performs a joystick operation, and a direction of the joystick operation is inconsistent with a direction of the target selected based on the skill, a direction range that is consistent with the direction of the target selected by the skill is determined. In a case that the direction of the joystick operation is within the direction range, it indicates that a target direction selected by the user is the same as a direction of the target selected by the skill, but the accuracy of the joystick operation is low. In this case, the target selected by the skill is still used as the skill target. In a case that the direction of the joystick operation exceeds the direction range, it indicates that the user intends to cast the skill in another direction in this case. In this way, the target closest to the user is selected as the skill target within the nearby range based on the user's new operation direction.

As an example, in FIG. 6B, there is a second virtual object 602 to which the skill can act within the range around the controlled virtual object 601, but the user's joystick operation points to another direction. In view of this, the skill cast direction is determined again according to the joystick operation.

Figure 8A:
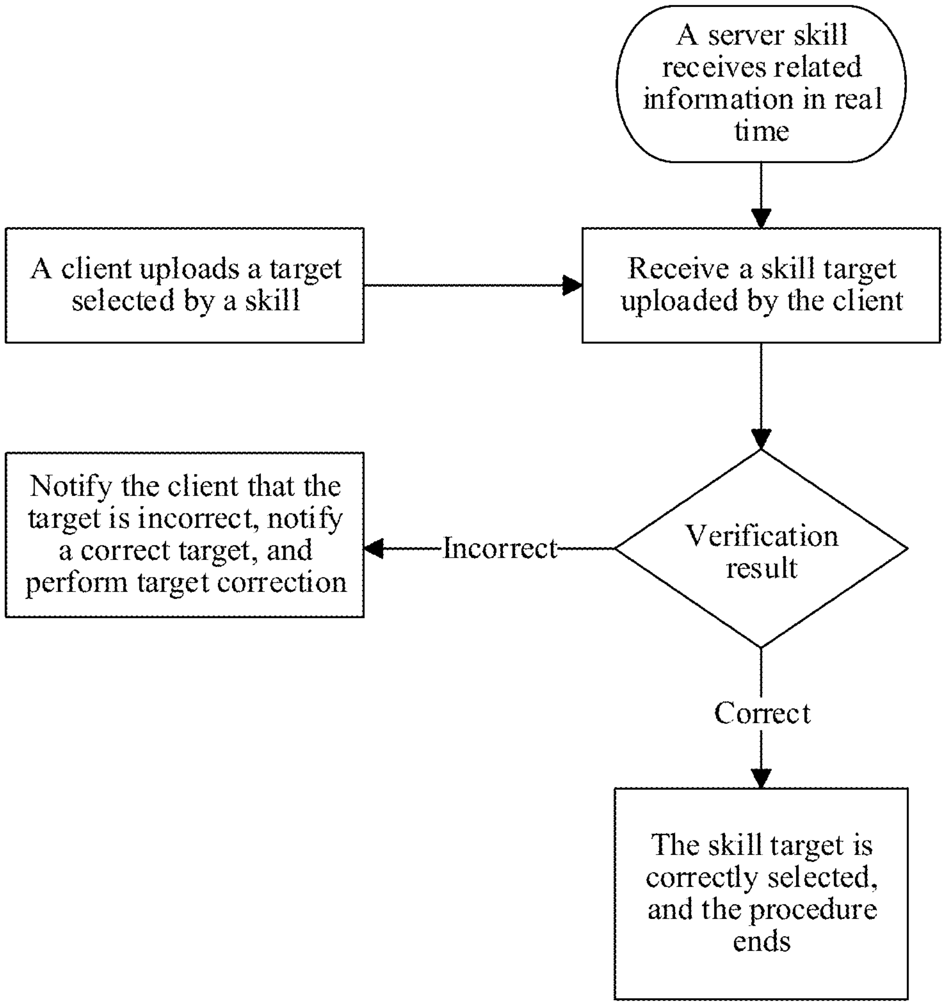
FIG. 8A and FIG. 8B are flowcharts of a virtual object control method according to an embodiment of this disclosure.
Figure 8B:
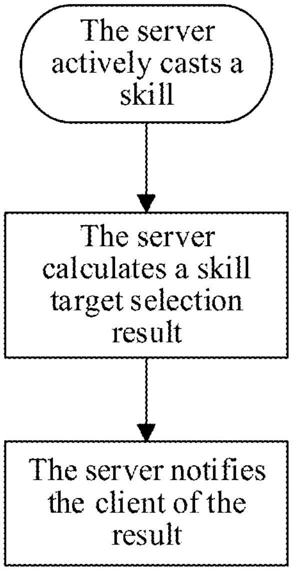

Referring to FIGS. 7A, 7B, 8A, and 8B, FIG. 7A and FIG. 7B are schematic principle diagrams of a virtual object control method according to an embodiment of this disclosure, and FIGS. 8A and 8B are flowcharts of a virtual object control method according to an embodiment of this disclosure. An implementation of the virtual object control method provided in this embodiment of this disclosure is described with reference to FIGS. 7A, 7B, 8A, and 8B.

1. Client Side (1) Target Selection

In some embodiments, after the skill is cast, the skill target may be automatically selected in a case that the user does not select a skill target at this time. The logic of skill target selection is as follows:

1) In FIG. 7A, a coordinate system is determined by using a position of the controlled virtual object as an origin and using a positive orientation of the controlled virtual object as a positive direction. An enemy closest to the controlled virtual object is searched within a range with an angle of θ and a distance of L1 (that is, a distance between the target and the controlled virtual object is L1) as a target of the skill.

2) In a case that there is no enemy within the range described in 1), an enemy closest to the controlled virtual object is searched within a range with an angle of θ and a distance of L2 (e.g., a distance between the target and the controlled virtual object is L2) as a target of the skill.

3) In a case that there is still no enemy within the range described in 2), a result of target selection at this time is that there is no target.

For example, θ, L1, and L2 mentioned above are configuration parameters.

For example, some skills do not need to execute skill target selection logic during application, and such skills may be configured in the configuration without executing skill target selection logic.

(2) Operation after the Skill is Cast

1) After releasing the skill, an attack target may be automatically selected in a case that the user has no target at this time and the skill has target selection logic.

2) The controlled virtual object turns to an attack target in a case that an attack target is selected. The controlled virtual object may normally cast the skill in a case that there is no attack target.

3) Target switching processing may be performed in a case that the user has a joystick operation while the skill is cast, and a new target is used as a skill target in a case that the new target is successfully switched.

The specific logic of target switching processing is as follows:

In FIG. 7B, in the process of casting the skill, the following determination process is performed in a case that the user performs the joystick operation: the controlled virtual object and the selected target determine a direction (e.g., a direction corresponding to the target in FIG. 7B), a direction (e.g., a direction corresponding to the joystick in FIG. 7B) is determined based on the joystick operation (using a camera as a coordinate system), and an angle between the two directions is θ; the controlled virtual object normally turns to the selected target in a case that $\theta<\theta 1/2$; in a case that $\theta>\theta 1/2$, whether there is an enemy within a range with left and right angle of θ2 and a distance of L1 (e.g., a distance from the controlled virtual object is L1) is determined based on the direction corresponding to the joystick, if there is, the enemy is set as a new target; and there is not, two processing manners are as follows:

A) Continue to use an original target as the skill target.

B) The controlled virtual object turns to the direction corresponding to the joystick, and casts the skill towards the front of the controlled virtual object.

For example, L1, θ1, and θ2 mentioned above are configuration parameters.

2. Server Side

In some embodiments, in the process of casting the skill, the client performs a rehearsal of the skill logic and the server performs verification. The server also verifies the target selected by the skill, and in a case that there is no problem, a result of the client is accepted, and the skill is normally cast. In a case that there is a problem, it is determined that there is a problem with skill casting on the client, and correction is performed.

In an example, FIG. 8A is a process in which the server verifies the target selection result of the skill cast by the client. For example, after receiving the skill target uploaded by the client, the server verifies the skill target. In a case that the verification is incorrect, notifies the client that the target is incorrect and sends a correct target, and the target is corrected; and in a case that the verification is correct, the skill target is selected correctly, and the procedure ends.

In some embodiments, there are skills that are directly cast by the server, such as an AI release skill controlled by the server. In this case, the target selection logic of the server is the same as the foregoing target selection logic of the client, but the relevant logic is run on the server, and the result is notified to the client.

As an example, FIG. 8B is a process in which the server actively casts the skill and notifies the client of the result. For example, when the server actively casts the skill, the skill target selection result is calculated and the result is sent to the client.

In this embodiment of this disclosure, in the process of casting the skill by the user, a most suitable skill target is selected according to skills of different types and a direction setting operation by the user. In addition, each skill can determine its own target selection logic through configuration parameters according to the skill characteristics, thereby improving the user's combat experience.

With reference to FIG. 2, the following further describes an exemplary structure in which the virtual object control apparatus 555 provided in this embodiment of this disclosure is implemented as software modules. In some embodiments, as shown in FIG. 2, the software module stored in the virtual object control apparatus 555 of the memory 550 may include a selection module 5551 and a direction setting module 5552. One or more modules, submodules, and/or units of the apparatus can be implemented by processing circuitry, software, or a combination thereof, for example.

The selection module 5551 is configured to display, in response to a selection operation on a to-be-cast skill of a first virtual object, a skill cast locking identifier corresponding to a second virtual object at a position of the second virtual object matching a type of the skill. The direction setting module 5552 is configured to determine, in response to a direction setting operation on the skill and in a case that there is a deviation between the set cast direction and the second virtual object relative to a direction of the first virtual object, a third virtual object according to a cast direction, display a skill cast locking identifier corresponding to the third virtual object at a position of the third virtual object, and cancel the display of the skill cast locking identifier of the second virtual object.

In the foregoing solution, the selection module 5551 is further configured to determine a plurality of indicators associated with the type of the skill and a parameter range corresponding to each indicator; determine a plurality of candidate virtual objects in a virtual scene, and determine a parameter value of the plurality of candidate virtual objects corresponding to each indicator; and determine the second virtual object in the plurality of candidate virtual objects according to the parameter value of the plurality of candidate virtual objects corresponding to each indicator and the parameter range, a type of the indicator including: a direction, a distance, a health status, and a defense capability.

In the foregoing solution, the type of the skill is associated with a priority indicator, and the priority indicator is one of the plurality of indicators associated with the type of the skill that has a highest priority. The selection module 5551 is further configured to determine, in the plurality of candidate virtual objects, candidate virtual objects whose parameter values corresponding to the indicators are all within the parameter range; and sort the determined candidate virtual objects in ascending order of a parameter value corresponding to the priority indicator, and determine a part of the candidate virtual objects ranked top in an ascending sorting result as the second virtual object.

In the foregoing solution, the indicator associated with the type of the skill includes a direction and a distance; a parameter range corresponding to the direction includes a first direction range; and a parameter range corresponding to the distance includes a first distance range and a second distance range, a priority of the first distance range being higher than a priority of the second distance range; and the selection module 5551 is further configured to determine, in the plurality of candidate virtual objects, candidate virtual objects within the first direction range relative to the first virtual object and within the first distance range relative to the first virtual object; and determine candidate virtual objects within the first direction range relative to the first virtual object and within the second distance range relative to the first virtual object in a case that there is no virtual object within the first direction range relative to the first virtual object and within the first distance range relative to the first virtual object.

In the foregoing solution, the selection module 5551 is further configured to determine, in a case that the skill is used for performing a confrontational behavior, virtual objects fighting against a group to which the first virtual object belongs in the virtual scene as the candidate virtual objects; and determine, in a case that the skill is used for performing an assisting behavior, virtual objects that belong to the same group as the first virtual object in the virtual scene as the candidate virtual objects.

In the foregoing solution, the virtual object control apparatus 555 further includes a cast module, configured to cast the skill to the third virtual object in a case that a display duration of the skill cast locking identifier of the third virtual object exceeds a duration threshold; or cast the skill to the third virtual object in response to a cast operation on the skill.

In the foregoing solution, the cast module is further configured to determine, in response to a direction change operation on the skill and in a case that there is a deviation between a changed cast direction and the third virtual object relative to the direction of the first virtual object, a fourth virtual object according to the changed cast direction in a process of casting the skill, and continue to cast the skill to the fourth virtual object.

In the foregoing solution, the direction setting module 5552 is further configured to determine a virtual object in the cast direction and closest to the first virtual object as the third virtual object in a case that an angle deviation between the cast direction and the second virtual object relative to the direction of the first virtual object is greater than a deviation threshold, in a case that the skill is used for performing a confrontational behavior, the third virtual object and the first virtual object belonging to different groups fighting against with each other; and the third virtual object and the first virtual object belonging to the same group in a case that the skill is used for performing an assisting behavior.

In the foregoing solution, the direction setting module 5552 is further configured to display prompt information for prompting to reset the cast direction in a case that an angle deviation between the cast direction and the second virtual object relative to the direction of the first virtual object is greater than a deviation threshold and there is no virtual object on which the skill can act in the cast direction.

In the foregoing solution, the direction setting module 5552 is further configured to display first prompt information in a case that the set cast direction is within a second direction range, the first prompt information being used for prompting that a virtual object on which the skill is to act may be redetermined according to the set cast direction.

In the foregoing solution, the direction setting module 5552 is further configured to display second prompt information in a case that the set cast direction is within a third direction range, the second prompt information being used for prompting that a virtual object on which the skill is to act is the second virtual object.

In the foregoing solutions, the direction setting module 5552 is further configured to display a skill cast locking identifier corresponding to a fifth virtual object at a position of the fifth virtual object in response to an object setting operation on the skill, and cancel the display of the skill cast locking identifier corresponding to the second virtual object, the fifth virtual object being a virtual object set by performing the object setting operation.

In the foregoing solution, the cast module is further configured to cast the skill to the second virtual object in a case that a display duration of the skill cast locking identifier of the second virtual object exceeds a duration threshold; or cast the skill to the second virtual object in response to a cast operation on the skill.

In the foregoing solution, the direction setting module 5552 is further configured to continue to display, in a case that an angle deviation between the cast direction and the second virtual object relative to the direction of the first virtual object is greater than a deviation threshold and there is no virtual object on which the skill can act in the cast direction, the skill cast locking identifier corresponding to the second virtual object at the position of the second virtual object.

An embodiment of this disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the foregoing virtual object control method described in the embodiments of this disclosure.

An embodiment of this disclosure provides a computer-readable storage medium (e.g., a non-transitory computer-readable storage medium) storing executable instructions, the executable instructions, when executed by a processor, causing the processor to perform the virtual object control method provided in the embodiments of this disclosure, for example, the virtual object control method shown in FIG. 3, 4, or 5.

In some embodiments, the computer-readable storage medium may include a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may include any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, the embodiments of this disclosure may include the following beneficial effects:

(1) A virtual object matching a type of a skill is automatically determined as a virtual object on which the skill is to act, so that user operations can be reduced, thereby improving the efficiency of selecting the virtual object.

(2) A user is enabled to manually adjust a cast direction to switch the virtual object on which the skill is to act, so that a hit rate of the skill can be improved, thereby improving the simulation performance of immersive perception of the virtual scene and the resource utilization of the graphics processing hardware.

(3) A target closest to that the user intends to attack can be selected as a target to which the skill is cast, so that different types of skills of the user can hit the target most desired to hit.

The foregoing descriptions are merely exemplary embodiments of this disclosure and are not intended to limit the scope of this disclosure. Other embodiments are within the scope of this disclosure.

What is claimed is:

1. A virtual object control method, the method comprising:

outputting for display a user interface that includes a plurality of function types;

receiving a user input selecting a function type from the plurality of function types for a first virtual object, each function type from the plurality of function types indicating a target category among a plurality of virtual objects in a virtual scene;

determining, by processing circuitry, a second virtual object as a target virtual object from the target category indicated by the selected function type, based on priority information of the selected function type that indicates a priority between at least two quantitative targeting parameter values of targeting criteria associated with the selected function type, the at least two quantitative targeting parameter values including (i) a first quantitative targeting parameter value based on a distance between the first virtual object and the second virtual object and (ii) a second quantitative targeting parameter value that is based on a direction angle of the second virtual object relative to the first virtual object, different function types from the plurality of function types corresponding to different priority information;

outputting for display a first target indicator that indicates the second virtual object is the target virtual object, the first target indicator including a visual indication based on the at least two quantitative targeting parameter values, the first target indicator being updated in synchronization with the at least two quantitative targeting parameter values in real-time;

determining, during execution of the selected function type, that the target virtual object for the selected function type is to be changed to a third virtual object based on a direction setting operation received through the user interface; and outputting for display a second target indicator that indicates the third virtual object is the target virtual object.

2. The method according to claim 1, wherein the determining whether the target virtual object for the selected function type is to be changed comprises:

determining that the target virtual object for the selected function type is to be changed to the third virtual object based on a deviation between a set direction indicated by the direction setting operation and a direction of the second virtual object relative to a direction of the first virtual object exceeding a threshold.

3. The method according to claim 2, further comprising:

displaying prompt information to reset the set direction based on an angle deviation between the set direction and the direction of the second virtual object relative to the direction of the first virtual object being greater than a deviation threshold and no other virtual object on which the selected function type is performable being in the set direction.

4. The method according to claim 1, further comprising:

displaying a function target identifier in association with the second virtual object based on the second virtual object being determined as the target virtual object for the selected function type; and displaying the function target identifier in association with the third virtual object based on the third virtual object being determined as the target virtual object for the selected function type.

5. The method according to claim 4, wherein after the direction setting operation on the selected function type is received, the method further comprises:

continuing to display the function target identifier in association with the second virtual object based on an angle deviation between a set direction indicated by the direction setting operation and the direction of the second virtual object relative to the direction of the first virtual object being greater than a deviation threshold and no other virtual object on which the selected function type is performable being in the set direction.

6. The method according to claim 1, wherein the targeting criteria further include at least one of a health status or a defense capability, and the at least two quantitative targeting parameter values further include a quantitative targeting parameter value for each of the at least one of the health status or the defense capability.

7. The method according to claim 6, wherein the priority information of the selected function type indicates that a targeting criterion of the targeting criteria has a highest priority; and the determining the second virtual object as the target virtual object comprises:

determining a plurality of candidate virtual objects from the target category indicated by the selected function type with quantitative targeting parameter values corresponding to the targeting criteria that are within corresponding parameter ranges; and determining the candidate virtual object with the highest quantitative targeting parameter value corresponding to the targeting criterion having the highest priority as the second virtual object.

8. The method according to claim 7, wherein the targeting criteria for the selected function type includes direction angle and distance;

a parameter range of the direction angle includes a first direction range;

at least one parameter range of the distance includes a first distance range and a second distance range, a priority of the first distance range being higher than a priority of the second distance range; and the determining the plurality of candidate virtual objects comprises:

determining whether at least one candidate virtual object of the plurality of candidate virtual objects has a quantitative targeting parameter value for the direction angle within the first direction range and a quantitative targeting parameter value for the distance within the first distance range; and determining whether at least one second candidate virtual object of the plurality of candidate virtual objects has a quantitative targeting parameter value for the direction angle within the first direction range and a quantitative targeting parameter value for the distance within the second distance range based on a determination that no virtual object has quantitative targeting parameter values within the first direction range and within the first distance range.

9. The method according to claim 6, wherein the determining the second virtual object as the target virtual object comprises:

determining virtual objects that are opponents of the first virtual object based on the selected function type being associated with a confrontational behavior; and determining virtual objects that are teammates of the first virtual object based on the selected function type being associated with an assisting behavior.

10. The method according to claim 1, wherein after the determining that the target virtual object for the selected function type is to be changed to the third virtual object, the method further comprises:

performing an operation associated with the selected function type on the third virtual object based on at least one of (i) a display duration of a function target identifier in association with the third virtual object exceeding a duration threshold or (ii) a perform operation input for the selected function type.

11. The method according to claim 10, wherein after the performing the operation associated with the selected function type on the third virtual object, the method further comprises:

determining, in response to a direction change operation that is associated with the selected function type and a deviation between a changed direction and a direction of the third virtual object relative to the direction of the first virtual object, a fourth virtual object as the target virtual object according to the changed direction while performing the operation associated with the selected function type; and continuing to perform the operation associated with the selected function type on the fourth virtual object.

12. The method according to claim 1, wherein the determining that the target virtual object for the selected function type is to be changed to the third virtual object includes determining a virtual object in a set direction indicated by the direction setting operation and closest to the first virtual object as the third virtual object based on an angle deviation between the set direction and the direction of the second virtual object relative to the direction of the first virtual object being greater than a deviation threshold, the third virtual object and the first virtual object belong to different groups when the selected function type is associated with a confrontational behavior, and the third virtual object and the first virtual object belong to a same group when the selected function type is associated with an assisting behavior.

13. The method according to claim 1, wherein while responding to the direction setting operation on the selected function type, the method further comprises:

displaying first prompt information when a set direction indicated by the direction setting operation is within a second direction range, the first prompt information indicating that the target virtual object on which the selected function type is to be performed is based on the set direction.

14. The method according to claim 1, wherein while responding to the direction setting operation on the selected function type, the method further comprises:

displaying second prompt information when a set direction indicated by the direction setting operation is within a third direction range, the second prompt information indicating that the target virtual object on which the selected function type is to be performed is the second virtual object.

15. The method according to claim 1, wherein after the determining the second virtual object as the target virtual object for the selected function type, the method further comprises:

performing an operation associated with the selected function type on the second virtual object based on at least one of (i) a display duration of a function target identifier in association with the second virtual object exceeding a duration threshold or (ii) a perform operation input for the selected function type.

16. A virtual object control apparatus, comprising:

processing circuitry configured to:

output for display a user interface that includes a plurality of function types;

receive a user input that selects a function type from the plurality of function types for a first virtual object, each function type from the plurality of function types indicating a target category among a plurality of virtual objects in a virtual scene;

determine a second virtual object as a target virtual object from the target category indicated by the selected function type, based on priority information of the selected function type that indicates a priority between at least two quantitative targeting parameter values of targeting criteria associated with the selected function type, the at least two quantitative targeting parameter values including (i) a first quantitative targeting parameter value based on a distance between the first virtual object and the second virtual object and (ii) a second quantitative targeting parameter value that is based on a direction angle of the second virtual object relative to the first virtual object, different function types from the plurality of function types corresponding to different priority information;

output for display a first target indicator that indicates the second virtual object is the target virtual object, the first target indicator including a visual indication based on the at least two quantitative targeting parameter values, the first target indicator being updated in synchronization with the at least two quantitative targeting parameter values in real-time;

determine, during execution of the selected function type, that the target virtual object for the selected function type is to be changed to a third virtual object based on a direction setting operation received through the user interface; and output for display a second target indicator that indicates the third virtual object is the target virtual object.

17. The virtual object control apparatus according to claim 16, wherein the processing circuitry is configured to:

determine that the target virtual object for the selected function type is to be changed to the third virtual object based on a deviation between a set direction indicated by the direction setting operation and a direction of the second virtual object relative to a direction of the first virtual object exceeding a threshold.

18. The virtual object control apparatus according to claim 16, wherein the processing circuitry is configured to:

display a function target identifier in association with the second virtual object based on the second virtual object being determined as the target virtual object for the selected function type; and display the function target identifier in association with the third virtual object based on the third virtual object being determined as the target virtual object for the selected function type.

19. The virtual object control apparatus according to claim 16, wherein targeting criteria further include at least one of a health status or a defense capability, and the at least two quantitative targeting parameter values further include a quantitative targeting parameter value for each of the at least one of the health status or the defense capability.

20. A non-transitory computer-readable storage medium, storing instructions which when executed by a processor cause the processor to perform:

outputting for display a user interface that includes a plurality of function types;

receiving a user input selecting a function type from the plurality of function types for a first virtual object, each function type from the plurality of function types indicating a target category among a plurality of virtual objects in a virtual scene;

determining a second virtual object as a target virtual object from the target category indicated by the selected function type, based on priority information of the selected function type that indicates a priority between at least two quantitative targeting parameter values of targeting criteria associated with the selected function type, the at least two quantitative targeting parameter values including (i) a first quantitative targeting parameter value based on a distance between the first virtual object and the second virtual object and (ii) a second quantitative targeting parameter value that is based on a direction angle of the second virtual object relative to the first virtual object, different function types from the plurality of function types corresponding to different priority information;

outputting for display a first target indicator that indicates the second virtual object is the target virtual object, the first target indicator including a visual indication based on the at least two quantitative targeting parameter values, the first target indicator being updated in synchronization with the at least two quantitative targeting parameter values in real-time;

determining, during execution of the selected function type, that the target virtual object for the selected function type is to be changed to a third virtual object based on a direction setting operation received through the user interface; and outputting for display a second target indicator that indicates the third virtual object is the target virtual object.

* * * * *